US009432549B2

(12) United States Patent
Komano et al.

(10) Patent No.: US 9,432,549 B2
(45) Date of Patent: Aug. 30, 2016

(54) INFORMATION PROCESSING DEVICE, SERVER DEVICE, AND PERIPHERAL DEVICE MANAGEMENT METHOD

(75) Inventors: Tatsuya Komano, Kahoku (JP);
Hikohisa Kitai, Kahoku (JP);
Yoshinobu Araya, Kahoku (JP);
Yoshihisa Taira, Kahoku (JP)

(73) Assignee: PFU LIMITED, Ishikawa (JP)

( * ) Notice: Subject to any disclaimer, the term of this patent is extended or adjusted under 35 U.S.C. 154(b) by 680 days.

(21) Appl. No.: 12/873,683

(22) Filed: Sep. 1, 2010

(65) Prior Publication Data

US 2011/0231542 A1  Sep. 22, 2011

(30) Foreign Application Priority Data

Mar. 19, 2010  (JP) .................................. 2010-064297

(51) Int. Cl.
*H04N 1/32* (2006.01)
*H04N 1/00* (2006.01)

(52) U.S. Cl.
CPC ....... *H04N 1/32122* (2013.01); *H04N 1/00344* (2013.01); *H04N 1/00238* (2013.01); *H04N 1/00241* (2013.01); *H04N 1/00832* (2013.01); *H04N 2201/0081* (2013.01); *H04N 2201/0082* (2013.01); *H04N 2201/3202* (2013.01); *H04N 2201/3204* (2013.01); *H04N 2201/3205* (2013.01); *H04N 2201/3274* (2013.01); *H04N 2201/3278* (2013.01)

(58) Field of Classification Search
USPC .......................................... 709/220, 221, 224
See application file for complete search history.

(56) References Cited

U.S. PATENT DOCUMENTS

| 6,809,830 | B1 * | 10/2004 | Lafky ................... G06F 3/1204 358/1.13 |
| 6,963,698 | B2 * | 11/2005 | Kondo ............... G03G 15/5075 399/12 |
| 7,194,218 | B2 * | 3/2007 | Kondo ............... G03G 15/5075 399/12 |
| 7,761,883 | B2 * | 7/2010 | Kasama ................... G06F 8/61 717/173 |
| 7,886,033 | B2 * | 2/2011 | Hopmann ........... H04L 12/2807 370/401 |
| 7,899,920 | B2 * | 3/2011 | Yanagi .................. G06F 13/387 370/449 |

(Continued)

FOREIGN PATENT DOCUMENTS

| JP | 2002-027552 A | 1/2002 |
| JP | 2002-108734 A | 4/2002 |

(Continued)

OTHER PUBLICATIONS

Notice of Reason for Rejection dated Apr. 2, 2013, issued in corresponding Japanese Patent Application No. 2010-064297, with English translation (6 pages).

*Primary Examiner* — Vivek Srivastava
*Assistant Examiner* — Muhammad Raza
(74) *Attorney, Agent, or Firm* — Westerman, Hattori, Daniels & Adrian, LLP

(57) ABSTRACT

A user terminal 1, which is communicably connected to a server device 2 via a network 9, includes: an information acquisition unit 101 that acquires terminal information including a terminal ID of the user terminal 1, and acquires peripheral device information including a device type and a serial number of a peripheral device 3 connected to the user terminal 1 via an interface 15 for peripheral device connection, which is different from a network interface 16 connected to the network 9; and a transmission/reception unit 102 that transmits the terminal information and the peripheral device information to the server device 2.

6 Claims, 17 Drawing Sheets

| CONNECTION INFORMATION TABLE ||||||
|---|---|---|---|---|
| TERMINAL ID | TYPE OF CONNECTED PERIPHERAL DEVICE | SERIAL NUMBER OF CONNECTED PERIPHERAL DEVICE | CONNECTION DATE/TIME | DISCONNECTION DATE/TIME |
| 1 | SCANNER | A | 2010/1/1 1:10:10 | 2010/1/3 1:12:12 |
| 2 | SCANNER | B | 2010/1/4 1:14:14 | NULL |
| 1 | SCANNER | C | 2010/1/6 1:16:16 | NULL |
| 3 | SCANNER | A | 2010/1/10 1:10:10 | 2010/1/11 1:12:12 |

(56) References Cited

U.S. PATENT DOCUMENTS

| | | | |
|---|---|---|---|
| 7,925,729 B2* | 4/2011 | Bush | H04L 12/2807 709/223 |
| 8,037,161 B2* | 10/2011 | Moribe | H04L 12/66 709/223 |
| 8,230,049 B2* | 7/2012 | Nagashima | G06F 9/4411 709/220 |
| 8,281,058 B1* | 10/2012 | McCorkendale et al. | 710/104 |
| 8,478,849 B2* | 7/2013 | Marl | H04L 12/2807 709/223 |
| 2003/0038731 A1 | 2/2003 | Sako et al. | |
| 2003/0115298 A1* | 6/2003 | Baker | 709/220 |
| 2004/0073912 A1* | 4/2004 | Meza | 719/321 |
| 2004/0078720 A1 | 4/2004 | Ito et al. | |
| 2004/0210897 A1* | 10/2004 | Brockway et al. | 717/174 |
| 2005/0108369 A1* | 5/2005 | Sather et al. | 709/220 |
| 2005/0200883 A1* | 9/2005 | Mannion | 358/1.15 |
| 2007/0260763 A1* | 11/2007 | Kasama | 710/8 |
| 2008/0181626 A1* | 7/2008 | Mizutani | G03G 15/5075 399/24 |
| 2008/0288633 A1* | 11/2008 | Evans | G06F 3/1209 709/224 |
| 2008/0301326 A1* | 12/2008 | Han | G06F 9/4413 710/19 |
| 2009/0077187 A1* | 3/2009 | Azuma | H04W 48/18 709/206 |
| 2009/0310165 A1* | 12/2009 | Olsson et al. | 358/1.15 |

FOREIGN PATENT DOCUMENTS

| | | |
|---|---|---|
| JP | 2003-122710 A | 4/2003 |
| JP | 2003-296044 A | 10/2003 |
| JP | 2006-185251 A | 7/2006 |
| JP | 2008-015616 A | 1/2008 |

* cited by examiner

FIG. 3

TERMINAL TABLE

| TERMINAL ID | TYPE OF CONNECTED PERIPHERAL DEVICE | SERIAL NUMBER OF CONNECTED PERIPHERAL DEVICE | DRIVER INFORMATION | RELATED APPLICATION INFORMATION | POWER STATE |
|---|---|---|---|---|---|
| 1 | SCANNER | A | v1.1 | v1.a | ON |
| 2 | SCANNER | B | v1.2 | v1.b | ON |
| 3 | NULL | NULL | v1.3 | v1.c | OFF |

FIG. 4

PERIPHERAL DEVICE TABLE

| TYPE OF CONNECTED PERIPHERAL DEVICE | SERIAL NUMBER OF CONNECTED PERIPHERAL DEVICE | FIRMWARE INFORMATION | POWER STATE | CONSUMABLE ITEM | CUMULATIVE USE AMOUNT | THRESHOLD VALUE | CONSUMABLE ITEM | CUMULATIVE USE AMOUNT | THRESHOLD VALUE |
|---|---|---|---|---|---|---|---|---|---|
| SCANNER | A | v1.1.1 | ON | a | 1000 | 8700 | b | 2600 | 8700 |
| SCANNER | B | v1.1.2 | OFF | a | 200 | 8500 | | | |
| SCANNER | C | v1.1.3 | OFF | | | | | | |

FIG. 5

USE HISTORY TABLE

| TYPE OF CONNECTED PERIPHERAL DEVICE | SERIAL NUMBER OF CONNECTED PERIPHERAL DEVICE | CONSUMABLE ITEM | USE AMOUNT | CONNECTION DATE/TIME | DISCONNECTION DATE/TIME |
|---|---|---|---|---|---|
| SCANNER | A | a | 400 | 2010/1/1 1:10:10 | 2010/1/3 1:12:12 |
| SCANNER | A | b | 2000 | 2010/1/1 1:10:10 | 2010/1/3 1:12:12 |
| SCANNER | B | a | 200 | 2010/1/5 1:14:14 | NULL |
| SCANNER | A | a | 600 | 2010/1/6 1:16:16 | NULL |
| SCANNER | A | b | 600 | 2010/1/6 1:16:16 | NULL |

FIG. 6

EVENT LOG TABLE

| EVENT OCCURRENCE DATE/TIME | TERMINAL ID | TYPE OF CONNECTED PERIPHERAL DEVICE | SERIAL NUMBER OF CONNECTED PERIPHERAL DEVICE | CONSUMABLE ITEM | MESSAGE |
|---|---|---|---|---|---|
| 2010/1/1 1:12:12 | 1 | SCANNER | A | a | Error1 |
| 2010/1/2 2:12:12 | 2 | SCANNER | B | a | Error2 |
| 2010/1/3 1:22:13 | 2 | SCANNER | A | | Error1 |
| 2010/1/4 1:22:13 | 3 | SCANNER | A | | Error1 |

FIG. 7

CONNECTION INFORMATION TABLE

| TERMINAL ID | TYPE OF CONNECTED PERIPHERAL DEVICE | SERIAL NUMBER OF CONNECTED PERIPHERAL DEVICE | CONNECTION DATE/TIME | DISCONNECTION DATE/TIME |
|---|---|---|---|---|
| 1 | SCANNER | A | 2010/1/1 1:10:10 | 2010/1/3 1:12:12 |
| 2 | SCANNER | B | 2010/1/4 1:14:14 | NULL |
| 1 | SCANNER | C | 2010/1/6 1:16:16 | NULL |
| 3 | SCANNER | A | 2010/1/10 1:10:10 | 2010/1/11 1:12:12 |

FIG. 8

CONSUMABLE ITEM CHARACTERISTIC TABLE

| TYPE OF CONNECTED PERIPHERAL DEVICE | SERIAL NUMBER OF CONNECTED PERIPHERAL DEVICE | CONSUMABLE ITEM | LIMIT VALUE |
|---|---|---|---|
| SCANNER | A | a | 10000 |
| SCANNER | A | b | 10000 (default) |
| SCANNER | B | a | 9500 (default) |

FIG. 9

USE TENDENCY TABLE

| TYPE OF CONNECTED PERIPHERAL DEVICE | SERIAL NUMBER OF CONNECTED PERIPHERAL DEVICE | CONSUMABLE ITEM | TENDENCY |
|---|---|---|---|
| SCANNER | A | a | 130 TIMES/DAY |
| SCANNER | A | b | 130 TIMES/DAY |
| SCANNER | B | a | 100 TIMES/DAY |

FIG. 10

| SOFTWARE CORRESPONDENCE TABLE | | |
|---|---|---|
| DRIVER VERSION | FIRMWARE VERSION | RELATED APPLICATION VERSION |
| v1.1 | v1.1.1-v1.1.9 | v1.a |
| v1.2 | v1.1.1-v1.2.9 | v1.b |

INFORMATION PROCESSING DEVICE, SERVER DEVICE, AND PERIPHERAL DEVICE MANAGEMENT METHOD

This application is based upon and claims the benefit of priority of the prior Japanese Patent Application No. JP2010-064297, filed on Mar. 19, 2010, the entire contents of which are incorporated herein by reference.

FIELD

The present invention relates to management of a peripheral device connected to an information processing device.

BACKGROUND

There is provided a technology for a system including peripheral equipment connected to a network, a server, and a personal computer (see Japanese Patent Laid-Open Publication No. 2002-108734). In the technology, when a resource is downloaded, two kinds of addresses, i.e., an address such as a MAC address uniquely assigned to each equipment and an address such as an IP address that may be set by a user, are previously managed on the server along with the resource to be downloaded, and the two kinds of addresses, i.e., the MAC address and the network address, of the peripheral equipment on the network are compared with information managed on the server on a regular basis, to thereby automatically determine movement and replacement of the peripheral equipment.

SUMMARY

There is a conventional technology in which a server device centrally manages terminals by causing the terminal to be managed to use agent software installed thereon to collect terminal information and an event log and to notify the server device thereof.

However, according to the conventional technology, the server device may manage terminals (including devices such as a printer and a scanner) directly connected to a network allowing communications with the server device, but may not manage peripheral devices that are connected to an interface for peripheral device connection conforming to various standards such as a universal serial bus (USB), a small computer system interface (SCSI), and the Institute of Electrical and Electronics Engineers, Inc. (IEEE) without being directly connected to the network.

In view of the problem, an object of the present invention is to cause a server device to also manage a peripheral device that is not connected to a network allowing direct communications with the server device.

In order to achieve the object, the present invention adopts the following means. That is, according to the present invention, there is provided an information processing device, which is communicably connected to a server device via a network, including: a terminal information acquisition unit to acquire terminal information related to the information processing device, the terminal information including information that may identify the information processing device; a peripheral device information acquisition unit to acquire peripheral device information related to a peripheral device connected to the information processing device via an interface for peripheral device connection, which is different from a communication interface connected to the network, the peripheral device information including information that may identify the peripheral device; and a transmission unit to transmit the terminal information and the peripheral device information to the server device.

The information processing device according to the present invention allows the server device to manage the peripheral device by acquiring the information on the information processing device side and transmitting the information to the server device, the information also regarding the peripheral device that may not be directly managed by the server device because of being connected to the interface for peripheral device connection, which is different from the interface (for example, wired or wireless LAN interface or WAN interface) connected to the network through which communications are performed between the server device and the information processing device. Note that examples of the "interface for peripheral device connection" used herein include an interface for peripheral device connection conforming to various standards such as USB, SCSI, and IEEE.

Further, the information processing device according to the present invention may further include: a connection status detection unit to detect that the peripheral device has been connected to or disconnected from the information processing device; and a connection information acquisition unit to acquire connection information related to detected connection or disconnection, the connection information including date/time information regarding the connection or the disconnection. The peripheral device information acquisition unit may acquire, in response to the detection of the connection or the disconnection performed by the connection status detection unit, the peripheral device information related to the peripheral device regarding the connection or the disconnection, and the transmission unit may transmit, in response to the detection of the connection or the disconnection performed by the connection status detection unit, the terminal information, the peripheral device information, and the connection information to the server device.

According to the present invention, by detecting the connection or the disconnection of the peripheral device to or from the information processing device and transmitting the connection information regarding the detection successively to the server device, a management database of the peripheral device managed by the server device may maintain the latest state. Further, the connection information includes the date/time information regarding the connection or the disconnection. Therefore, the dates/times at which the peripheral device is connected to and disconnected from the information processing device may be recorded as a history.

Further, the present invention may be grasped as the server device that manages the information processing device as described above. That is, according to the present invention, there is provided a server device, including: a reception unit to receive terminal information including information that may identify an information processing device communicably connected to the server device via a network, the terminal information being transmitted from the information processing device, and peripheral device information including information that may identify a peripheral device connected to the information processing device via an interface for peripheral device connection, which is different from a communication interface connected to the network; and an information accumulation unit to accumulate the terminal information and the peripheral device information in association with the information that may identify the information processing device that is an information transmission source and the information that may identify the peripheral device.

According to the server device of the present invention, even for the peripheral device that may not be managed directly from the server device because of not being connected directly to the network allowing communications with respect thereto, it is possible for the server device to manage the peripheral device by receiving the information transmitted from the information processing device and accumulating the information.

Further, according to the present invention, the reception unit may further receive connection information including date/time information regarding connection or disconnection of the peripheral device detected by the information processing device, the connection information being transmitted from the information processing device, and the information accumulation unit may accumulate the connection information in association with the information that may identify the information processing device regarding the connection or the disconnection and the information that may identify the peripheral device.

According to the present invention, by receiving the connection information regarding the connection or the disconnection of the peripheral device to or from the information processing device successively from the information processing device, the management database of the peripheral device managed by the server device may maintain the latest state. Further, the connection information includes the date/time information regarding the connection or the disconnection. Therefore, the dates/times at which the peripheral device is connected to and disconnected from the information processing device may be recorded as a history.

The server device according to the present invention may further include a movement detection unit to detect that the peripheral device has been moved by being disconnected from one information processing device and being connected to another information processing device, by way of searching the connection information accumulated by the information accumulation unit by using the information that may identify the peripheral device, to thereby extract a history of the connection and the disconnection of the peripheral device to and from the information processing device.

According to the present invention, by providing the movement detection unit as described above, the administrator or the user may instantaneously grasp the movement of the peripheral device. The movement detection unit may detect the movement of the peripheral device, for example, if the latest connection information regarding a given peripheral device is the connection information indicating the connection to the information processing device and if the connection information indicating the connection to another information processing device in the past exists as the connection information regarding the peripheral device.

Further, according to the present invention, the reception unit may further receive an activation state of the peripheral device connected to the information processing device, the activation state being transmitted from the information processing device, and the server device may further include: an information update unit to update the peripheral device information accumulated by the information accumulation unit based on the connection information received by the reception unit so as to enable judgment as to whether or not the peripheral device regarding the peripheral device information is connected to the information processing device; and an unused peripheral device detection unit to detect a peripheral device that has not been activated and a peripheral device that is not connected to the information processing device by referencing the activation state and the peripheral device information.

By detecting the unused peripheral device, the administrator may instantaneously grasp the peripheral device that is not currently used, may extract an idle asset, or may consider moving the peripheral device that is connected to a given information processing device but is not being used to another information processing device.

Further, the server device according to the present invention may further include: an input reception unit to receive an input of a specified date/time; and a peripheral device extraction unit to extract a peripheral device that was connected to any one of the information processing devices at the specified date/time by extracting, from the connection information accumulated by the information accumulation unit, connection information with a date/time regarding the connection being at or before the specified date/time and a date/time regarding the disconnection being at or after the specified date/time or being unrecorded.

According to the present invention, by providing the peripheral device extraction unit as described above, the administrator may specify the past date/time to check the connection status or the like between the peripheral device and the information processing device, which was obtained at the specified date/time.

Further, according to the present invention, the reception unit may further receive an event log of an event that has occurred on the information processing device, the event log being transmitted from the information processing device, the information accumulation unit may further accumulate the event log in association with the information that may identify the information processing device regarding the event and the information that may identify the peripheral device regarding the event, and the server device may further include an event log extraction unit to search the event log accumulated by the information accumulation unit by using information that may identify a predetermined peripheral device, to thereby extract the event log regarding the predetermined peripheral device.

By performing such accumulation and extraction of the event log, even if the peripheral device has moved among a plurality of the information processing devices, the administrator may track the event log of a desired peripheral device. Note that the event log extraction unit may extract the event log regarding the information processing device by searching the event log accumulated by the information accumulation unit by using information that may identify a predetermined information processing device.

Further, the server device according to the present invention may further include an estimation unit to estimate a cause for an occurrence of the event by judging, if the movement detection unit has detected that the predetermined peripheral device has been moved by being disconnected from the one information processing device and being connected to the another information processing device, whether or not contents of the event log regarding the predetermined peripheral device which is extracted by the event log extraction unit are changed before and after the movement.

According to the present invention, by providing such estimation unit, it is possible to estimate the cause for the occurrence of the event by discriminating whether the occurrence of the event is ascribable to the peripheral device or ascribable to the connected information processing device in a case in which the event such as an error related to the peripheral device has occurred.

Further, according to the present invention, the reception unit may further receive software information transmitted from the information processing device, the software information including information on software installed on the peripheral device connected to the information processing device, and information on software related to the peripheral device, which is installed on the information processing device, and the server device may further include: a correlation information retaining unit to retain correlation information for judging a correlation between the software installed on the information processing device and the software installed on the peripheral device; a correlation judgment unit to judge, by referencing the correlation information based on the software information received by the reception unit, whether or not the software installed on the information processing device and the software installed on the peripheral device have a predetermined correlation; and a request transmission unit to transmit, if it is judged that the software installed on the information processing device and the software installed on the peripheral device do not have the predetermined correlation, a software change request necessary to satisfy the predetermined correlation to the information processing device.

According to the present invention, unlike the conventional software updating simply maintains software in the latest state, a plurality of items of software, which need compatibility between a plurality of devices for a cooperation therebetween or the like, may maintain a state in which the correlation such as compatibility is kept. Further, the software change request according to the present invention is issued for the purpose of maintaining the correlation such as compatibility, and hence a request may be made for a change to the software of an older version in some cases instead of simply making a request for an upgrade of the software, or if the correlation is lost due to the update of the software, a processing of inhibiting the request for the upgrade or other such processing may be performed. Note that with regard to the concern about security that may be caused by a downgrade request or update inhibition, it is preferred that a separate measure be taken by a method of avoiding a downgrade involved in the security update, a method of avoiding the update inhibition, or other such method.

Further, the present invention may be grasped as the invention of a method executed by a computer, the invention of a program, or the invention of a computer-readable recording medium having such a program recorded thereon. For example, according to the present invention, there is provided a peripheral device management method, including: acquiring, by a computer communicably connected to a server device via a network, terminal information related to the computer, the terminal information including information that may identify the computer; acquiring, by the computer, peripheral device information related to a peripheral device connected to the computer via an interface for peripheral device connection, which is different from a communication interface connected to the network, the peripheral device information including information that may identify the peripheral device; and transmitting, by the computer, the terminal information and the peripheral device information to the server device.

According to the present invention, it is possible to cause the server device to also manage the peripheral device that is not connected to the network allowing direct communications with the server device.

BRIEF DESCRIPTION OF THE DRAWINGS

FIG. 3 is a diagram illustrating a structure of a terminal table according to the embodiment;

FIG. 4 is a diagram illustrating a structure of a peripheral device table according to the embodiment;

FIG. 5 is a diagram illustrating a structure of a use history table according to the embodiment;

FIG. 6 is a diagram illustrating a structure of an event log table according to the embodiment;

FIG. 7 is a diagram illustrating a structure of a connection information table according to the embodiment;

FIG. 8 is a diagram illustrating a structure of a consumable item characteristic table according to the embodiment;

FIG. 9 is a diagram illustrating a structure of a use tendency table according to the embodiment;

FIG. 10 is a diagram illustrating a structure of a software correspondence table according to the embodiment;

DESCRIPTION OF EMBODIMENTS

Hereinafter, description is made of a peripheral device management system 100 using an information processing device, a server device, a method, and a program according to an embodiment of the present invention with reference to the drawings. Note that the embodiment described below merely describes an example in which the present invention is implemented, and the present invention is not limited to a specific configuration described below. When the present invention is implemented, it is preferred that such a specific configuration as to correspond to an embodiment be employed appropriately.

<Configuration>

Figure 1:
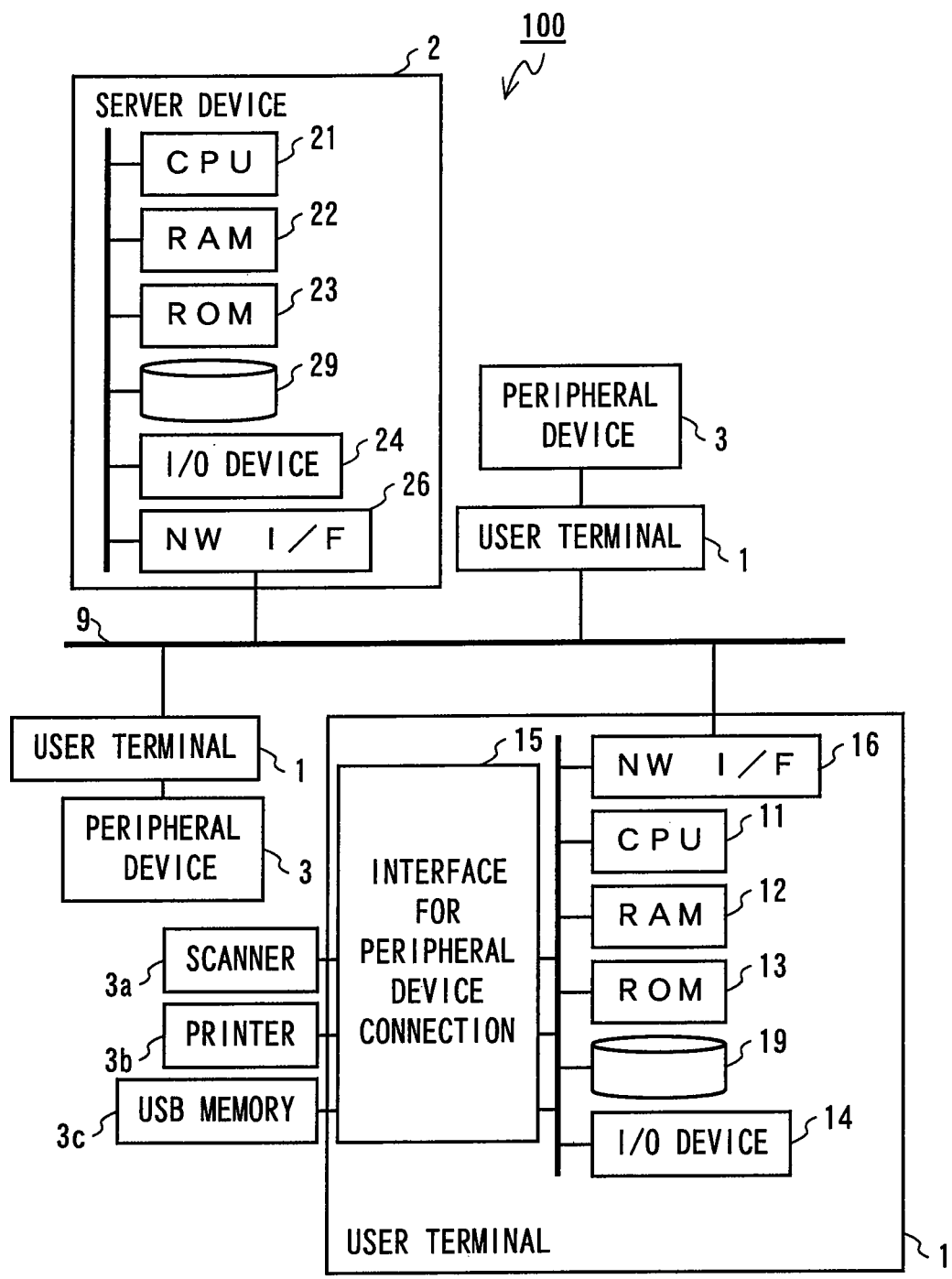
FIG. 1 is a diagram illustrating an entire configuration of a peripheral device management system according to an embodiment.

FIG. 1 is a diagram illustrating an entire configuration of the peripheral device management system 100 according to this embodiment. The peripheral device management system 100 is a system in which a user terminal 1 and a server device 2 are connected to each other via a network 9, and peripheral devices 3 such as a printer 3b, a scanner 3a, an external memory 3c are connected to the user terminal 1 via an interface 15 for peripheral device connection conforming to various standards such as USB, SCSI, and IEEE. Further, networks conforming to various standards such as various kinds of local area networks (LANs) including IEEE 802.3 and fiber-distributed data interface (FDDI) and various kinds of wide area networks (WANs) may be employed as the network 9 through which communications are performed between the server device 2 and the user terminal 1.

The user terminal 1 and the server device 2 are each a computer including: a central processing unit (CPU) 11, 21; a random access memory (RAM) 12, 22; a read only memory (ROM) 13, 23; an input/output device 14, 24 such as a display, a mouse, and a keyboard; a network interface 16, 26; and an auxiliary storage device 19, 29, which are electrically connected to one another. For example, an electrically erasable programmable ROM (EEPROM), a hard disk drive (HDD), or a solid state drive (SSD) may be used as the auxiliary storage device 19.

Further, the user terminal 1 is the information processing device used by a user, and specific examples thereof include a personal computer and a KIOSK terminal. The user terminal 1 includes the interface 15 for peripheral device connection which is used for connection to the peripheral device 3 as described above. Here, the interface 15 for peripheral device connection is a different interface from the network interface 16 connected to the network 9. The peripheral device 3 connected to the interface 15 for peripheral device connection may not establish direct connection to the server device 2 with which communications are performed via the network 9.

The CPU 11 and 21 as a central processing unit process commands and data expanded in the RAM 12 and 22 or the like, to thereby control the RAM 12 and 22, the auxiliary storage device 19 and 29, the input/output device 14 and 24, and the like, respectively. The RAM 12 and 22 as a main memory device are controlled by the CPU 11 and 21, and has various kinds of commands and data written thereto and read therefrom, respectively. The auxiliary storage device 19 and 29 as a nonvolatile storage device are subjected to a write/read operation of information to be retained, respectively, even if mainly the user terminal 1 or the server device 2 is powered off. Contents input through an input device are recorded in the RAM 12 and 22, and processed by the CPU 11 and 21, respectively.

Figure 11:
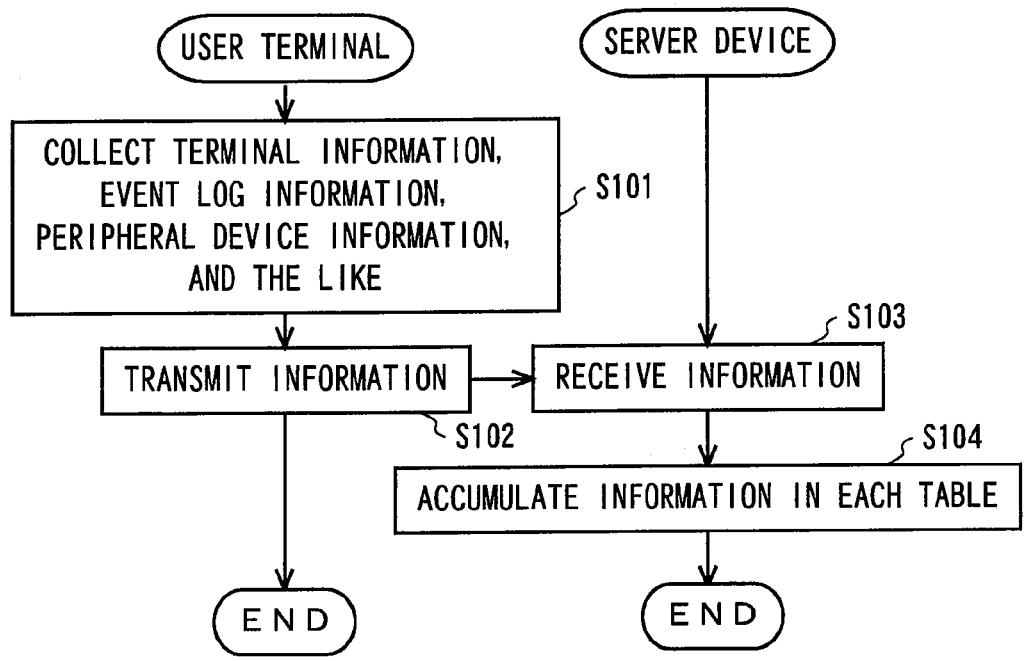
FIG. 11 is a flowchart illustrating a flow of an information collection processing according to the embodiment.

Stored respectively in the auxiliary storage device 19 and 29 are an operating system (OS) of the user terminal 1 or the server device 2 to be loaded in the RAM 12 and 22, various kinds of programs for executing processings illustrated in flowcharts of FIG. 11 and the subsequent figures, and various kinds of data used by the user terminal 1 or the server device 2.

Figure 2:
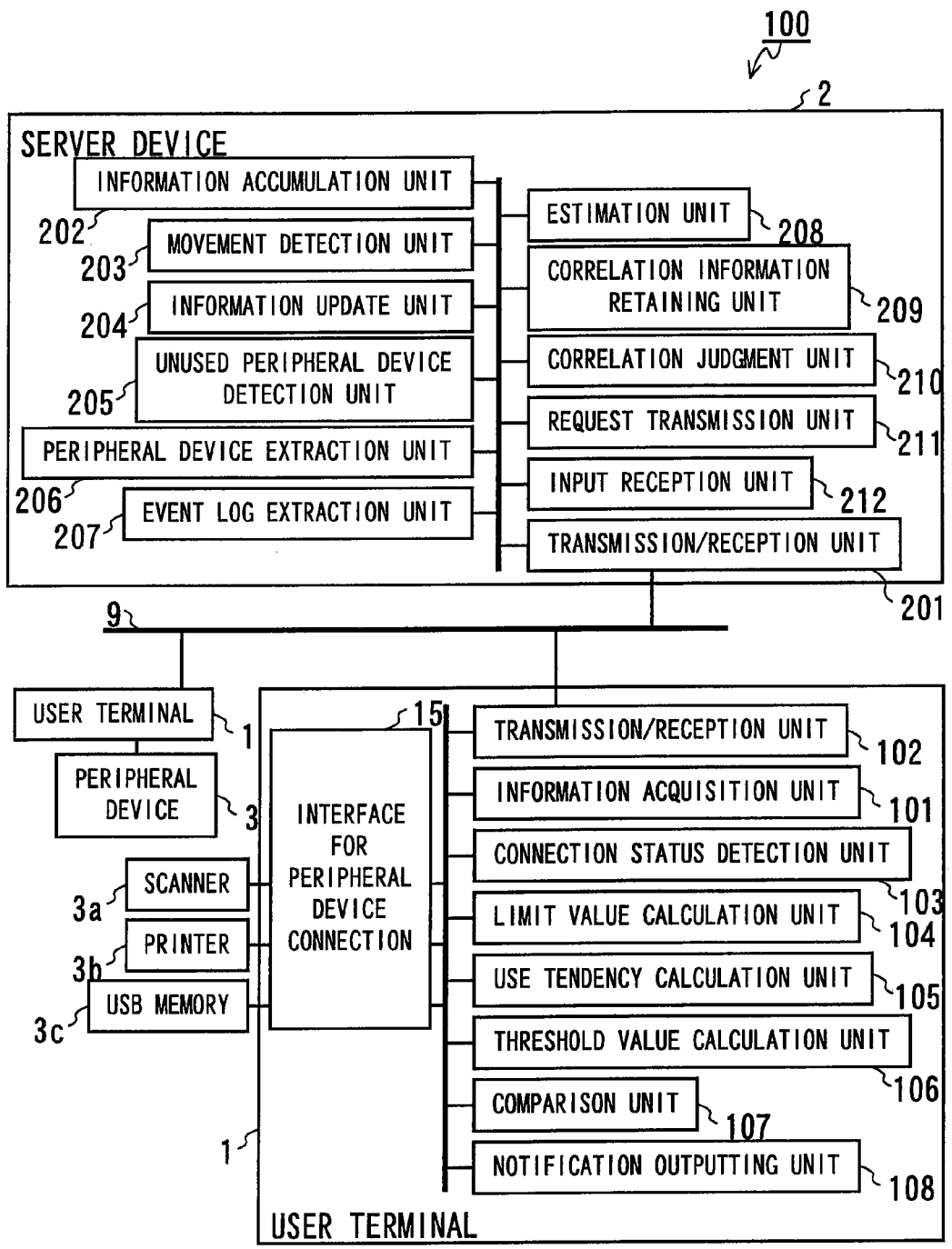
FIG. 2 is a diagram illustrating functional components of a user terminal and a server device according to the embodiment.

FIG. 2 is a diagram illustrating functional components of the user terminal 1 and the server device 2 according this embodiment. By causing the CPU 11 to interpret and execute the various kinds of programs expanded in the RAM 12, the user terminal 1 according to this embodiment functions as the information processing device according to the present invention including an information acquisition unit 101, a transmission/reception unit 102, a connection status detection unit 103, a limit value calculation unit 104, a use tendency calculation unit 105, a threshold value calculation unit 106, a comparison unit 107, and a notification outputting unit 108. Each of those functional units executes a function corresponding to each means included in the information processing device according to the present invention. Further, this embodiment is described by taking an example in which those functions are each executed by the general-purpose CPU 11, but a part or an entirety of those functions may be implemented by one or a plurality of dedicated processors.

On a regular basis or when the connection status detection unit 103 detects connection or disconnection of the peripheral device 3, the information acquisition unit 101 acquires various kinds of information related to the user terminal 1 and the peripheral device 3 connected to the user terminal 1, which include terminal information (terminal ID, related application information, driver information, and power state), event log information (event occurrence date/time, and message), peripheral device information (device type, serial number, firmware information, power state, and use amount of a consumable item), and connection detection information (including connection date/time and disconnection date/time).

The acquired information is transmitted to the server device 2 by the transmission/reception unit 102 described later, and also on the user terminal 1, accumulated in a database built on the auxiliary storage device 19. The user terminal 1 saves the acquired information to a peripheral device table, a use history table, an event log table, a connection information table, a consumable item characteristic table, a use tendency table, and the like within the local database different from a database on the server device 2. Note that the information acquisition unit 101 accumulates the acquired use amount of the consumable item on a consumable item basis, to thereby calculate a cumulative use amount on a consumable item basis and saves the cumulative use amount to the peripheral device table retained by the user terminal 1.

The transmission/reception unit 102 transmits various kinds of information acquired by the information acquisition unit 101, which include the terminal information, the peripheral device information, the event log information, and connection information, to the server device 2, and receives a software change request and the like transmitted from the server device 2.

The connection status detection unit 103 detects that the peripheral device 3 has been connected to or disconnected from the user terminal 1. Specifically, a notification of an event of connection or disconnection of the peripheral device 3 which is sent from the OS or a driver of the user terminal 1 is received, to thereby detect that the peripheral device 3 has been connected to or disconnected from the user terminal 1. Note that other detection methods may be employed, which include a method in which the connection status detection unit 103 itself directly monitors the interface 15 for peripheral device connection, to thereby detect that the peripheral device 3 has been connected to or disconnected from the user terminal 1.

The limit value calculation unit 104 calculates a limit value of the use amount estimated for a consumable item based on the cumulative use amount of the consumable item obtained at an occurrence date/time of an event regarding an event log including contents regarding the consumable item. More specifically, the limit value calculation unit 104 decides the limit value from the cumulative use amount of the consumable item obtained at the occurrence date/time of the event as it is, or calculates an average of the cumulative use amount of the consumable item obtained at the occurrence date/time of the event and one or a plurality of limit values calculated in the past, as a newly-estimated limit value of the use amount.

The use tendency calculation unit 105 divides the cumulative use amount by a use period of the consumable item, to thereby calculate a per-unit-time use amount of the consumable item as a use tendency of the consumable item. More specifically, the use tendency calculation unit 105 calculates the per-unit-time use amount of the consumable item by using a time from the connection date/time included in the connection information until the disconnection date/time included therein, or a time from the connection date/time to a present date/time as the use period of the consumable item.

The threshold value calculation unit 106 calculates a threshold value for judging a timing to output an exchange/replenishment prompt notification in comparison with the current cumulative use amount based on the use tendency and the limit value of the consumable item. More specifically, the threshold value calculation unit 106 calculates the threshold value by subtracting, from the limit value, a value obtained by multiplying the per-unit-time use amount of the consumable item by a period required for exchange/replenishment of the consumable item.

The comparison unit 107 compares the cumulative use amount with the threshold value on a regular basis or at a timing at which the cumulative use amount is updated. Then, if the cumulative use amount exceeds the threshold value as a result of the comparison performed by the comparison unit 107, the notification outputting unit 108 outputs the exchange/replenishment prompt notification for the consumable item.

Further, by causing the CPU 21 to interpret and execute the various kinds of programs expanded in the RAM 22, the server device 2 according to this embodiment functions as the server device 2 including a transmission/reception unit 201, an information accumulation unit 202, a movement detection unit 203, an information update unit 204, an unused peripheral device detection unit 205, a peripheral device extraction unit 206, an event log extraction unit 207, an estimation unit 208, a correlation information retaining unit 209, a correlation judgment unit 210, a request transmission unit 211, and an input reception unit 212. Each of those functional units executes a function corresponding to each means included in the server device 2 according to the present invention. Further, this embodiment is described by taking an example in which those functions are each executed by the general-purpose CPU 21, but a part or an entirety of those functions may be realized by one or a plurality of dedicated processors.

The transmission/reception unit 201 receives the various kinds of information transmitted from the user terminal 1, which include the terminal information (terminal ID, related application information, driver information, and power state), the event log information (event occurrence date/time and message), the peripheral device information (device type, serial number, firmware information, and power state), the connection detection information (including connection date/time and disconnection date/time).

The information accumulation unit 202 accumulates the various kinds of information received by the transmission/reception unit 201, which include the terminal information, the peripheral device information, the event log information, and the connection information, in association with the terminal ID of the user terminal 1 and the serial number of the peripheral device 3. Here, the information accumulation unit 202 accumulates the received various kinds of information in various kinds of tables including the connection information table described later based on classification thereof.

The movement detection unit 203 searches the connection information table by using the serial number of the peripheral device 3, to thereby extract a history of connection and disconnection of the peripheral device 3, and detect that the peripheral device 3 has been disconnected from one user terminal and has moved to another user terminal by being connected thereto. Further, the information update unit 204 updates contents of the peripheral device table based on the connection information received by the transmission/reception unit 201.

By referencing the power state of the terminal table and the peripheral device table and the connection date/time and the disconnection date/time, the unused peripheral device detection unit 205 detects the inactive peripheral device 3 and the peripheral device 3 that is not connected to the user terminal 1. Further, the input reception unit 212 receives an input of a specified date/time from an administrator or the user via the input/output device 14 or 24.

The peripheral device extraction unit 206 extracts the peripheral device 3 that was connected to the user terminal 1 at a specified date/time by extracting, from the connection information table, connection information with the connection date/time being at or before the specified date and the disconnection date/time being at or after the specified date or being NULL. Further, the event log extraction unit 207 searches the event log table by using the serial number of the peripheral device 3, to thereby extract an event log regarding the corresponding peripheral device 3.

Note that in this embodiment, the various kinds of information included in records accumulated in the table described later, such as the connection date/time and the disconnection date/time, are initialized by NULL. Therefore, in this embodiment, it may be determined that the corresponding information (such as disconnection date/time) has not yet been detected or input based on whether or not the information is NULL. However, the various kinds of information included in a table record may be initialized by another predetermined value (for example, value indicating that the information has not yet been detected or input), or it may be determined that the information has not yet been detected or input based on the predetermined value.

If it is detected by the movement detection unit 203 that the peripheral device 3 has been disconnected from one user terminal and has moved to another user terminal by being connected thereto, the estimation unit 208 estimates a cause for the occurrence of an event of an error or the like by judging whether or not contents of the event log extracted by the event log extraction unit 207 are changed before and after the movement.

The correlation information retaining unit 209 retains the software correspondence table for judging a correlation among the driver and a related application installed on the user terminal 1 and firmware installed on the peripheral device 3.

The correlation judgment unit 210 references the software correspondence table based on the received information on software, to thereby judge whether or not the driver and the related application installed on the user terminal 1 and the firmware installed on the peripheral device 3 have a predetermined correlation thereamong.

If it is judged that the driver and the related application installed on the user terminal 1 and the firmware installed on the peripheral device 3 do not have the predetermined correlation defined in the software correspondence table, the request transmission unit 211 transmits a change request for software necessary to satisfy the predetermined correlation to the user terminal 1.

<Data Structure>

Each of the server device 2 and the user terminal 1 retains information used for various kinds of processings executed in the peripheral device management system 100. Here, the various kinds of information to be saved are recorded in the various kinds of tables described below. Further, of the various kinds of tables described below, the peripheral device table, the use history table, the event log table, the connection information table, the consumable item characteristic table, and the use tendency table are also retained in the user terminal 1. However, information regarding another user terminal 1 (such as terminal ID) is not retained in the tables retained in the user terminal 1.

FIG. 3 is a diagram illustrating a structure of the terminal table according to this embodiment. Recorded in the terminal table are the terminal ID, the device type of the peripheral device 3, the serial number of the peripheral device 3, the driver information of the peripheral device 3, the related application information related to the peripheral device 3, and the power state of the user terminal 1. Here, the terminal ID is information that may uniquely identify the user terminal 1 at least within the network 9 managed by the server device 2. Examples of the terminal ID that may be used include a terminal name set so as to avoid an overlap within the network 9 and the MAC address of the user terminal 1.

Further, the device type is information indicating the kind of the peripheral device 3 connected to the user terminal 1. In this embodiment, the device type is classified according to main functions thereof. Acquired as the device type is such information as to allow judgment as to which of the printer 3b, the scanner 3a, the external memory 3c, and the like the peripheral device 3 is. Further, the serial number of the peripheral device 3 is acquired so as to identify the peripheral device 3.

The driver information is information regarding the program (driver) that is installed on the user terminal for controlling the peripheral device 3 from the user terminal 1 and executed by the user terminal 1. In this embodiment, the driver information includes version information on the driver.

The related application information is information regarding an application related to the peripheral device 3. The related application includes applications for performing a processing using a function implemented by the peripheral device 3 and performing a processing using input/output results produced by the peripheral device 3. In this embodiment, the related application information includes the version information on an application related to the function of the peripheral device 3.

FIG. 4 is a diagram illustrating a structure of the peripheral device table according to this embodiment. Recorded in the peripheral device table are the device type and the serial number of the peripheral device 3, the firmware information, the power state of the peripheral device 3, the consumable item name, the cumulative use amount of the consumable item, and the threshold value for judging the timing to output the exchange/replenishment prompt notification for the consumable item.

Here, the firmware information is information regarding firmware applied to the peripheral device 3. In this embodiment, the firmware information includes the version information on the firmware applied to the peripheral device 3. Note that description is omitted of information that overlaps with the information recorded in the terminal table described with reference to FIG. 3.

Further, for each table record regarding the peripheral device 3, the name of the consumable item used in the peripheral device 3 and the cumulative use amount are accumulated in the peripheral device table. Therefore, when the consumable item information on the peripheral device is received, the use amount included in the consumable item information on the peripheral device is accumulated in addition to the currently-retained cumulative use amount in the cumulative use amount of the peripheral device table. When being reset at the timing of exchange, replenishment, or the like of the consumable item, the cumulative use amount retains a total of the use amounts since the replenishment of the consumable item by being repeatedly added until the next reset each time the consumable item information on the peripheral device is received.

FIG. 5 is a diagram illustrating a structure of the use history table according to this embodiment. Recorded in the use history table are the device type and the serial number of the peripheral device 3, the consumable item name, the use amount of the consumable item, and the connection date/time and the disconnection date/time of the peripheral device 3. Further, in the use history table, a new record that records the use amount of the consumable item is added along with information indicating the connection date/time or the disconnection date/time each time the peripheral device 3 is connected or disconnected. In other words, the use amount of the consumable item is accumulated in the use history table for each period during which the peripheral device 3 is connected. This allows a grasp of the period during which the peripheral device 3 was connected to the user terminal 1, the use amount of the consumable item obtained during the period, and the like.

FIG. 6 is a diagram illustrating a structure of the event log table according to this embodiment. Recorded in the event log table is the event log information including the occurrence date/time of the event (including an error in addition to a normal processing), the terminal ID of a terminal in which an event has occurred, the device type and the serial number of the peripheral device 3 regarding the occurrence of the event, the consumable item name regarding the event that has occurred, and the message regarding the event (contents of the event).

FIG. 7 is a diagram illustrating a structure of the connection information table according to this embodiment. Recorded in the connection information table are: the terminal ID of the user terminal 1 regarding the detected connection or disconnection; and the device type and the serial number of the peripheral device 3 that regard the detected connection or disconnection, the connection date/time, and the disconnection date/time.

FIG. 8 is a diagram illustrating a structure of the consumable item characteristic table according to this embodiment. Recorded in the consumable item characteristic table are the device type and the serial number of the peripheral device 3 in which the consumable item is used, the consumable item name, and the limit value of the use amount of the consumable item (maximum amount of the consumable item that may be used).

FIG. 9 is a diagram illustrating a structure of the use tendency table according to this embodiment. Recorded in the use tendency table are the device type and the serial number of the peripheral device 3 in which the consumable item is used, the consumable item name, and the per-unit-time use amount of the consumable item as the use tendency.

FIG. 10 is a diagram illustrating a structure of the software correspondence table according to this embodiment. Recorded in the software correspondence table is a combination of the driver and the related application that are installed on the user terminal 1 and the firmware that is installed on the peripheral device 3, the combination having a predetermined correlation (in general, compatibility).

<Details of Processings>

Hereinafter, description is made of flows of processings for peripheral device management according to this embodiment with reference to FIGS. 11 to 17. Note that, prior to the processings described below, the server device 2 delivers, to the user terminal 1 connected to the network 9, a program for peripheral device management for monitoring the peripheral device 3 connected to the user terminal 1. The user terminal 1 executes the program for peripheral device management delivered by the server device 2, and keeps the program resident in the RAM 12 while the user terminal 1 is active. Note that in this embodiment, the program for peripheral device management includes a program for managing the consumable item.

FIG. 11 is a flowchart illustrating the flow of the information collection processing according to this embodiment. The processing illustrated in the flowchart is regularly executed by software for peripheral device management which stays resident in the user terminal 1, or executed by the user terminal 1 with the detection of the connection or disconnection of the peripheral device 3 as a trigger. Note that the processing illustrated in the flowchart is a mere example in terms of specific contents and sequence, and it is preferred that the processing contents and sequence suitable to an embodiment be employed as appropriate.

In Steps S101 and S102, the various kinds of information are collected in the user terminal 1, and the collected information is transmitted to the server device 2. The information acquisition unit 101 of the user terminal 1 monitors a connection status of the connected peripheral device 3, and when the peripheral device 3 connected to the user terminal 1 is detected, collects the various kinds of information including: the terminal information (terminal ID, related application information, driver information, and power state of user terminal 1) on the terminal connected to the peripheral device 3, the event log information (event occurrence date/time and message), and the peripheral device information (device type, serial number, firmware information, and power state of peripheral device 3) (Step S101), and the transmission/reception unit 102 transmits the collected information to the server device 2 (Step S102). The information items may be acquired from a function of managing the peripheral device 3 and the driver, which is included in the OS or the like of the user terminal 1. However, a method of acquiring the information items by causing the software for peripheral device management to directly query the peripheral device 3 may be employed instead of the method of acquisition from the OS or the like.

Note that the collected information is retained also in the peripheral device table, the use history table, the event log table, the connection information table, the consumable item characteristic table, and the use tendency table which are retained in the user terminal 1. The user terminal 1 may compare the information collected in the past and retained in each local table with newly-collected information each time the information is collected, and only if there is a difference or if there is a change in the contents of information, transmit the collected information to the server device 2.

In Steps S103 and S104, the information collected by the user terminal 1 is received, and accumulated in the database. The transmission/reception unit 201 of the server device 2 receives the terminal information, the event log information, the peripheral device information, and the like which have been transmitted by the user terminal 1 (Step S103), and the information accumulation unit 202 accumulates the received information items in the database in association with each other (Step S104). More specifically, the server device 2 accumulates the terminal information in the terminal table, the event log in the event log table, and the peripheral device information in the peripheral device table. Further, in the terminal table, the device type and the serial number of the peripheral device 3 connected to the corresponding user terminal 1 are additionally accumulated in association with the terminal ID. In this embodiment, by handling the device type and the serial number accumulated in association with the terminal ID as an external key of the peripheral device table, it is possible to associate, in the database, the user terminal 1 recorded in the terminal table with the peripheral device information regarding the peripheral device 3 connected to the user terminal 1. Further, the terminal ID of the user terminal 1 and the device type and the serial number of the peripheral device 3 regarding the event are recorded in the event log table in order to associate the user terminal 1 and the peripheral device 3 regarding the event with the event log.

Figure 12:
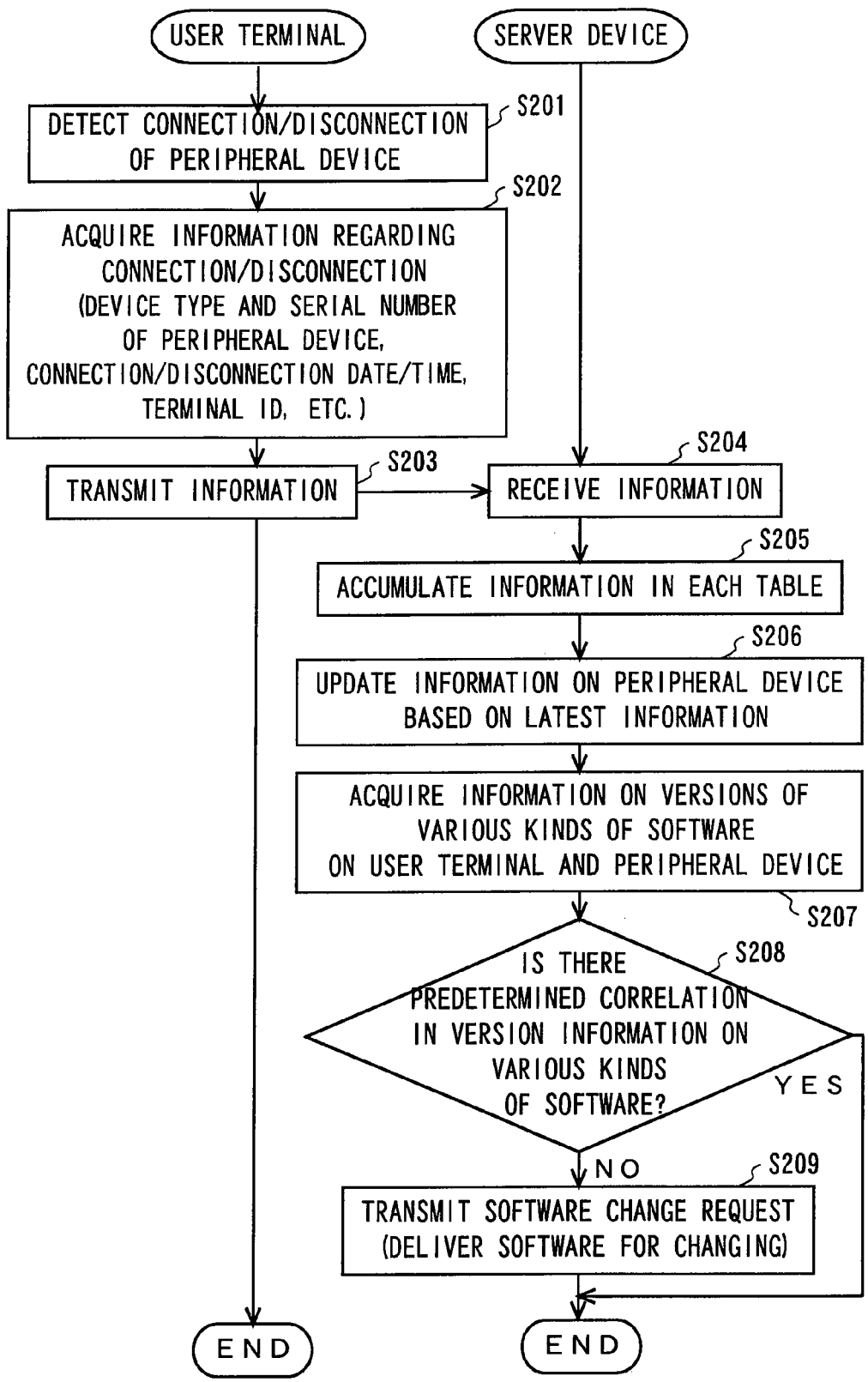
FIG. 12 is a flowchart illustrating a flow of a disconnection detection processing according to the embodiment.

FIG. 12 is a flowchart illustrating the flow of a disconnection defection processing according to this embodiment. The processing illustrated in the flowchart is regularly executed by software for peripheral device management which stays resident in the user terminal 1, or executed by the user terminal 1 with the detection of the connection or disconnection of the peripheral device 3 as a trigger. Note that the processing illustrated in the flowchart is a mere example in terms of specific contents and sequence, and it is preferred that the processing contents and sequence suitable to an embodiment be employed as appropriate.

In Steps S201 to S203, the connection or disconnection of the peripheral device 3 is detected, the various kinds of information are collected, and the collected information is transmitted to the server device 2. The connection status detection unit 103 of the user terminal 1 detects the connection or disconnection of the peripheral device 3 by receiving the notification of the event of the connection or disconnection of the peripheral device 3 which is sent from the OS or the driver of the user terminal 1 or by monitoring the state of the interface 15 for peripheral device connection (Step S201). If the connection or disconnection is detected, with the detection of the connection or disconnection as a trigger, the information acquisition unit 101 of the user terminal 1 acquires the device type and the serial number of the peripheral device 3, the connection detection information including the connection date/time or the disconnection date/time, and the terminal ID which regard the connection or disconnection (Step S202), and the transmission/reception unit 102 transmits the acquired information to the server device 2 (Step S203). After that, the processing advances to Step S204.

In Step S204 and Step S205, the information collected by the user terminal 1 is received and accumulated in the database. The transmission/reception unit 201 of the server device 2 receives the device type, the serial number, the connection detection information, and the terminal ID (hereinafter, the information items being referred to collectively as "connection information") that have been transmitted by the user terminal 1 (Step S204), and the information accumulation unit 202 accumulates the received information items in the database in association with one another (Step S205). More specifically, the information accumulation unit 202 accumulates the terminal ID, the device type, the serial number, and the connection detection information (connection date/time or disconnection date/time) in the connection information table.

However, if the information included in the received connection detection information is the disconnection date/time, the server device 2 identifies the connection information that was accumulated when the connection of the peripheral device 3 regarding the detected disconnection was detected, by searching the connection information table to extract a record including the terminal ID, the device type, and the serial number that have been received and having the disconnection date/time set to NULL (or value indicating that the disconnection date/time has not yet been notified of). Then, the information accumulation unit 202 records the received disconnection date/time in the identified record.

Note that the information accumulation unit 202 accumulates the connection information notified of by the user terminal 1 in the connection information table in a cumulative (additional) manner. In other words, if the connection information regarding the peripheral device 3 on which the connection information has already been accumulated is received when, for example, the identical peripheral device 3 is reconnected to a different user terminal 1, the information accumulation unit 202 adds a new record and accumulates the connection information in the connection information table without deleting the record that records the past connection information regarding the identical peripheral device 3 from the connection information table. According to this embodiment, by accumulating the connection information in a cumulative manner, it is possible to record the dates/times at which the peripheral device 3 is connected to and disconnected from the user terminal 1 as a history and grasp the period during which the peripheral device 3 has been connected to the user terminal 1. After that, the processing advances to Step S206.

In Step S206, the information on the peripheral device 3 recorded in the terminal table is updated. The information update unit 204 of the server device 2 uses the connection information received in Step S204 or the latest connection information extracted from the connection information table to update the information of the terminal table (in this embodiment, device type and serial number) to the latest state. Specifically, if the new connection information is information regarding the disconnection of the peripheral device 3 (in other words, if the connection detection information is the disconnection date/time), the information update unit 204 uses the terminal ID included in the connection information to identify the record of the user terminal 1 regarding the disconnection in the terminal table, and deletes the device type and the serial number of the disconnected peripheral device 3 from the record.

On the other hand, if the new connection information is information regarding the connection of the peripheral device 3 (in other words, if the connection detection information is the connection date/time), the information update unit 204 uses the terminal ID included in the connection information to identify the record of the user terminal 1 regarding the connection in the terminal table, and adds the device type and the serial number of the newly-connected peripheral device 3 to the record. Note that, as a result of searching the terminal table by using the device type and the serial number of the peripheral device 3 regarding the connection, if the device type and the serial number of the peripheral device 3 are left recorded in the record of the user terminal 1 from which the peripheral device 3 should have been disconnected, the device type and the serial number may be deleted from the record. After that, the processing advances to Step S207.

According to the processing illustrated in the flowchart, the connection information is used to update the information of the terminal table to the latest state, and hence the terminal table may be updated immediately after the connection and disconnection of the peripheral device 3 to keep the terminal table in the latest state.

In Steps S207 and S208, the version information on various kinds of software applied to the user terminal 1 and the peripheral device 3 is acquired, and a correspondence status of version of the software is determined. If the new connection information is the information regarding the connection of the peripheral device 3, the server device 2 reads the current firmware version applied to the peripheral device 3 from the peripheral device table, and reads versions of the driver and the related application installed on the user terminal 1 currently connected to the peripheral device 3 from the terminal table (Step S207). Then, the correlation judgment unit 210 of the server device 2 acquires the software correspondence table from the correlation information retaining unit 209, and references the software correspondence table to check whether or not the various kinds of version information read in Step S207 have the correlation defined in the software correspondence table (Step S208). If it is determined that the various kinds of version information read in Step S207 have the correlation defined in the software correspondence table, the processing illustrated in the flowchart is brought to an end. If it is determined that there is a combination of software that does not match the correlation defined in the software correspondence table, the processing advances to Step S209.

In Step S209, the software change request is transmitted. If there is included a combination of software that does not match the correlation defined in the software correspondence table among the driver version and the related application version of the user terminal 1 and the firmware version of the peripheral device 3, the correlation judgment unit 210 references the software correspondence table to identify software as the cause. Then, the request transmission unit 211 of the server device 2 transmits the change request for the software as the cause to the user terminal 1 so that the correspondence status of version among the various kinds of software satisfies the correlation defined in the software correspondence table. If necessary, the server device 2 may previously retain software for changing such as an updater for the various kinds of software in the auxiliary storage device 29 of the server device 2 and deliver the necessary software of changing to the user terminal 1, or the user terminal 1 may confirm that a processing of changing software has been completed. After that, the processing illustrated in the flowchart is brought to an end.

According to the processing illustrated in the flowchart, unlike the conventional software updating simply maintains software in the latest state, the software including the driver, the firmware, and the related application, which needs some correlation such as compatibility between the user terminal 1 and the peripheral device 3, may maintain a state in which the correlation such as compatibility is kept. Further, the software change request is issued in order to maintain the correlation such as compatibility, and hence a request may be made for a change to the software of an older version in some cases instead of simply making a request for an upgrade of the software, or if the correlation is lost due to the update of the software, a processing of inhibiting the request for the upgrade or other such processing may be performed.

Further, according to the processing illustrated in the flowchart, instead of simply maintaining the latest version of the various kinds of software related to the peripheral device 3, which include the driver, the firmware, and the related application, such a state as to satisfy the compatibility may be maintained by referencing the software correspondence table to check the presence/absence of the compatibility.

Figure 13:
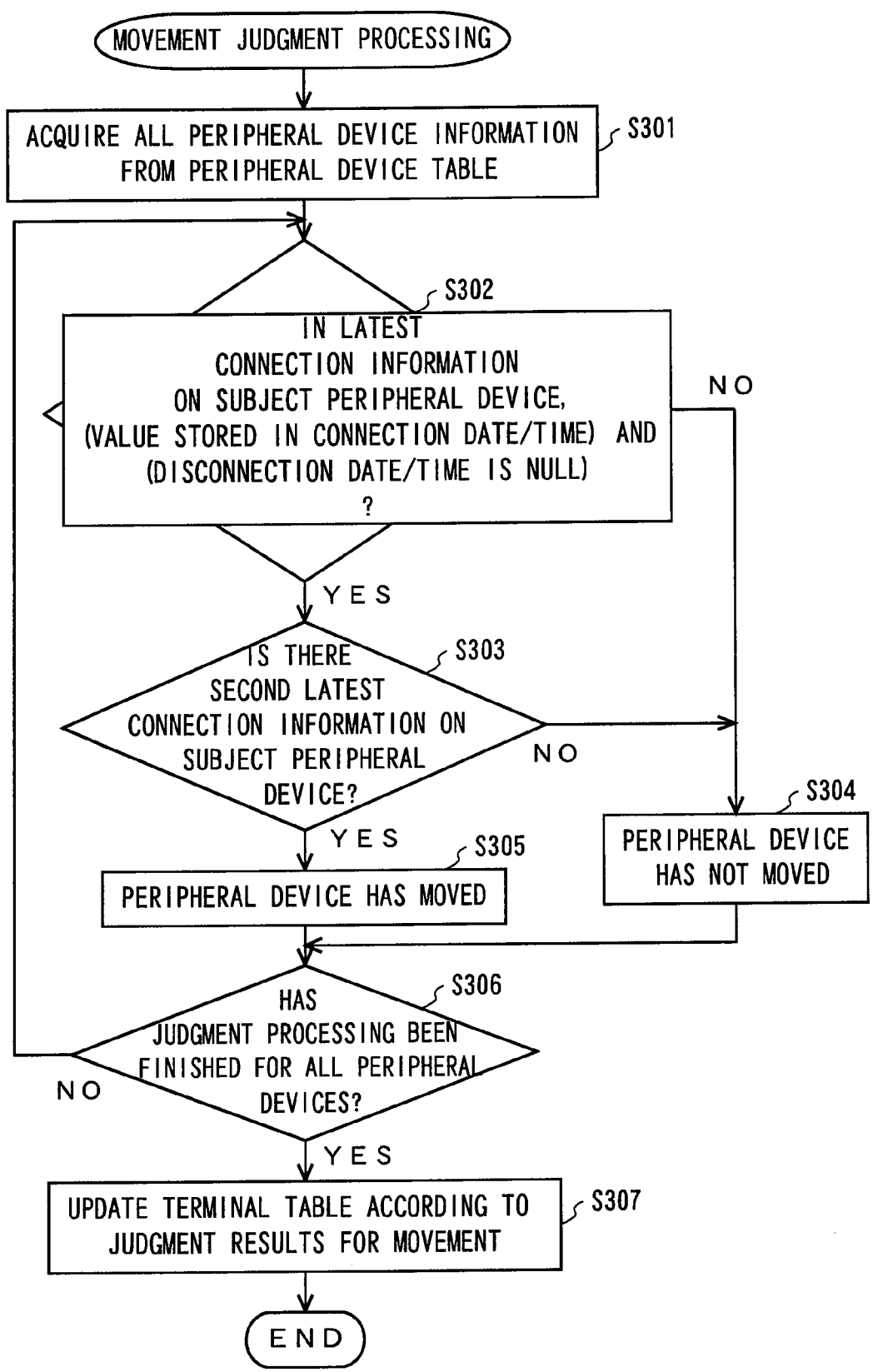
FIG. 13 is a flowchart illustrating a flow of a movement judgment processing for a peripheral device according to the embodiment.

FIG. 13 is a flowchart illustrating the flow of a movement judgment for the peripheral device 3 according to this embodiment. The processing illustrated in the flowchart is regularly executed, or executed with the reception of the connection information or the like from the user terminal 1 as a trigger. Note that the processing illustrated in the flowchart is a mere example in terms of specific contents and sequence, and it is preferred that the processing contents and sequence suitable to an embodiment be employed as appropriate.

In Step S301, the peripheral device information is acquired. The server device 2 acquires all the peripheral device information from the peripheral device table. After that, the processing advances to Step S302. The processing of Steps S302 to S306 described below is repeatedly executed while changing the peripheral device 3 to be subjected to a judgment processing every loop until the judgment processing is finished for all the peripheral devices 3 identified by using the device type and the serial number.

In Steps S302 to S305, the connection date/time and the disconnection date/time are referenced to judge whether or not the peripheral device 3 has moved. The movement detection unit 203 of the server device 2 determines whether or not a value (date/time) is stored (not NULL) in the connection date/time of the latest record of the connection information table that is related to the peripheral device 3 to be subjected to the judgment processing with the disconnection date/time being set to NULL (Step S302). Further, the movement detection unit 203 determines whether or not there exists the second latest record of the connection information table that is related to the peripheral device 3 to be subjected to the judgment processing (Step S303). If both the judgment results of Steps S302 and S303 are positive, in other words, if the value is stored in the connection date/time of the latest record of the connection information table, the disconnection date/time is set to NULL, and the second latest record of the connection information table exists, the processing advances to Step S305. On the other hand, if even one of the criteria is not satisfied, the processing advances to Step S304.

Step S304 is executed if the value is not stored in the connection date/time of the latest record of the connection information table, the disconnection date/time is not set to NULL (value is stored in the disconnection date/time), or the second latest record of the connection information table does not exist. In this case, the movement detection unit 203 judges that the peripheral device 3 has not moved because it may not be read from the history recorded in the connection information table that the peripheral device 3 to be subjected to the judgment processing is currently connected to any one of the user terminals 1 and that the peripheral device 3 to be subjected to the judgment processing was disconnected from another user terminal 1 in the past. After that, the processing advances to Step S306.

Step S305 is executed if the value is stored in the connection date/time of the latest record of the connection information table, the disconnection date/time is set to NULL, and the second latest record of the connection information table exists. In this case, the movement detection unit 203 judges that the peripheral device 3 has moved because it may be read from the history recorded in the connection information table that the peripheral device 3 to be subjected to the judgment processing is currently connected to any one of the user terminals 1 and that the peripheral device 3 to be subjected to the judgment processing was disconnected from another user terminal 1 in the past. After that, the processing advances to Step S306.

In Step S306, it is determined whether or not the judgment processing for the presence/absence of the movement has been finished for all the peripheral devices 3. If the judgment processing has not been finished for all the peripheral devices 3, the peripheral device 3 to be subjected to the judgment processing is changed, and the processing advances to Step S302. If the judgment processing has been finished for all the peripheral devices 3, the processing advances to Step S307. In other words, the processing of Steps S302 to S306 is repeatedly executed until the judgment processing has been finished for all the peripheral devices 3 recorded in the peripheral device table.

In Step S307, the terminal table is updated according to the judgment results for the movement. By using the latest connection information on the peripheral device 3 judged to have moved in Step S305, the information update unit 204 updates the information on the terminal table (in this embodiment, device type and serial number) to the latest state. The information update unit 204 uses the terminal ID included in the connection information to identify the record of the user terminal 1 regarding the connection in the terminal table, and adds, to the record, the device type and the serial number of the peripheral device 3 judged to have moved. Note that, as a result of searching the terminal table by using the device type and the serial number of the peripheral device 3 regarding the movement, if the device type and the serial number of the peripheral device 3 are left recorded in the record of the user terminal 1 from which the peripheral device 3 should have been disconnected, the device type and the serial number may be deleted from the record. After that, the processing illustrated in the flowchart is brought to an end.

According to the processing illustrated in the flowchart, the information on the terminal table is updated to the latest state in conjunction with the detection of the movement of the peripheral device 3. Therefore, the terminal table may maintain the latest state, and the administrator may instantaneously grasp the movement of the peripheral device 3. Note that the judgment results for the movement performed in Steps S302 to S305 may be output as a notification with respect to the administrator, the user, or the like. As a method for the output, it is preferred that an optimal output method be employed according to an embodiment as appropriate from among an output to a display, a print output, a transmission output of electronic mail or the like, an output to a storage device such as the auxiliary storage device 19 or 29, and other such output.

Figure 14:
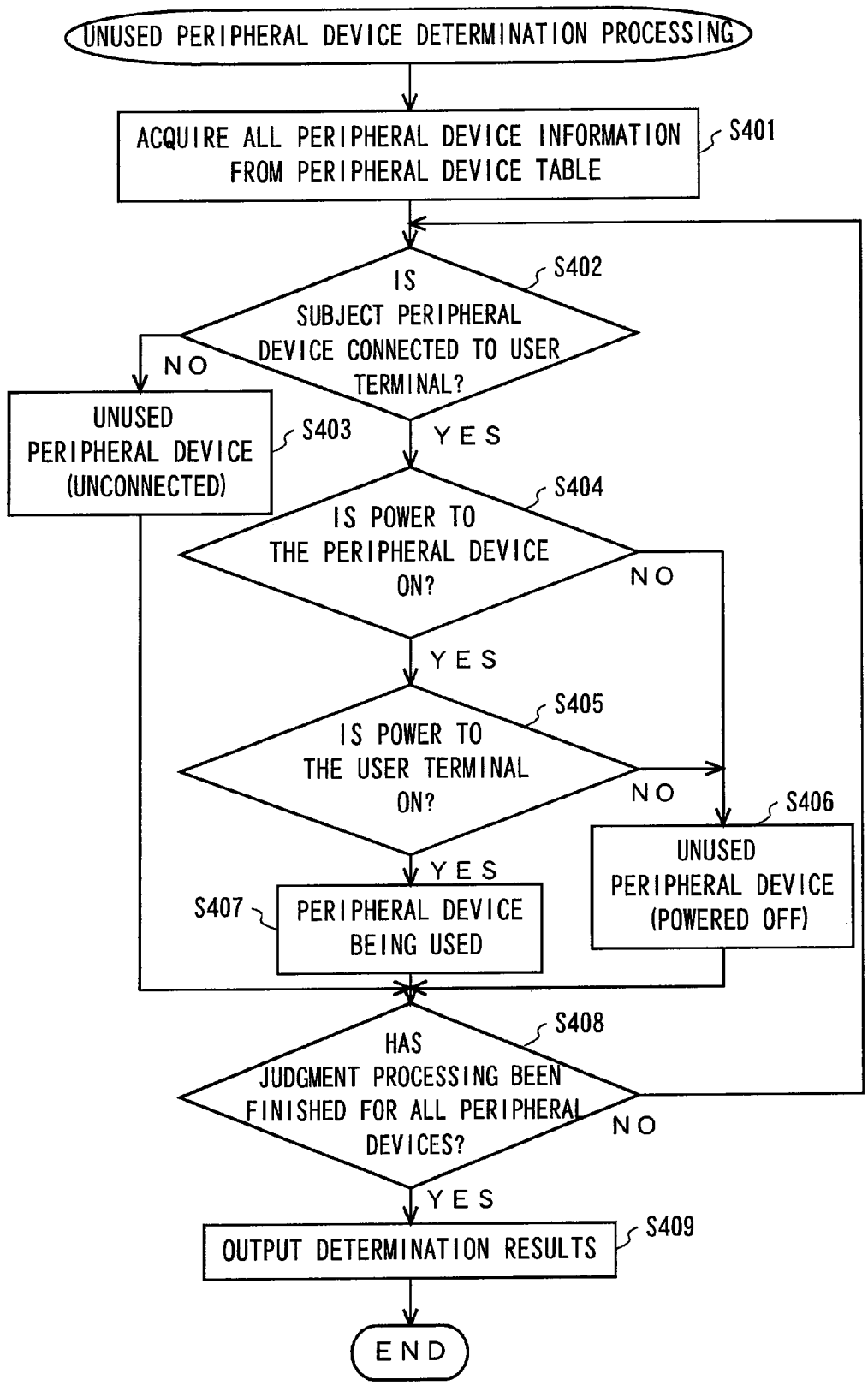
FIG. 14 is a flowchart illustrating a flow of an unused peripheral device judgment processing according to the embodiment.

FIG. 14 is a flowchart illustrating a flow of an unused peripheral device judgment processing according to this embodiment. The processing illustrated in the flowchart is executed on a regular basis or with the input of a processing start instruction issued by the user or the like via the input device or the network 9 as a trigger. Note that the processing illustrated in the flowchart is a mere example in terms of specific contents and sequence of the processing, and it is preferred that the processing contents and sequence suitable to an embodiment be employed as appropriate.

In Step S401, the peripheral device information is acquired. The server device 2 acquires all the peripheral device information from the peripheral device table. After that, the processing advances to Step S402. The processing of Steps S402 to S408 described below is repeatedly executed while changing the peripheral device 3 to be subjected to a judgment processing every loop until the judgment processing is finished for all the peripheral devices 3 identified by using the device type and the serial number.

In Step S402, it is determined whether or not the peripheral device 3 to be subjected to the judgment processing is connected to any one of the user terminals 1. The unused peripheral device detection unit 205 of the server device 2 searches the terminal table by using the device type and the serial number regarding the peripheral device 3 to be subjected to the judgment processing, to thereby determine whether or not the peripheral device 3 to be subjected to the judgment processing is connected to any one of the user terminals 1. If the device type and the serial number regarding the peripheral device 3 to be subjected to the judgment processing are retrieved from the terminal table, the processing advances to Step S404. If the device type or the serial number regarding the peripheral device 3 to be subjected to the judgment processing is not retrieved from the terminal table, the processing advances to Step S403.

In Step S403, it is determined that the peripheral device 3 to be subjected to the judgment processing is an unused peripheral device (unconnected). If the device type or the serial number regarding the peripheral device 3 to be subjected to the judgment processing is not retrieved from the terminal table in Step S402, the unused peripheral device detection unit 205 judges that the peripheral device 3 to be subjected to the judgment processing is not connected to any of the user terminals 1, and determines that the peripheral device 3 is the unused peripheral device (unconnected). After that, the processing advances to Step S408.

In Step S404, the power state of the peripheral device 3 to be subjected to the judgment processing is determined. The unused peripheral device detection unit 205 references the value of the power state within the record of the peripheral device table related to the peripheral device 3 to be subjected to the judgment processing, to thereby determine whether the power to the peripheral device 3 is currently on or off. If it is determined that the power to the peripheral device 3 is on, the processing advances to Step S405. If it is determined that the power to the peripheral device 3 is off, the processing advances to Step S406.

In Step S405, the power state of the user terminal 1 connected to the peripheral device 3 to be subjected to the judgment processing is determined. The unused peripheral device detection unit 205 references the value of the power state within the record of the terminal table related to the user terminal 1 connected to the peripheral device 3 to be subjected to the judgment processing, which has been retrieved in Step S402, to thereby determine whether the power to the user terminal 1 is currently on or off. If it is determined that the power to the user terminal 1 is on, the processing advances to Step S407. If it is determined that the power to the user terminal 1 is off, the processing advances to Step S406.

In Step S406, it is determined that the peripheral device 3 to be subjected to the judgment processing is the unused peripheral device (powered off). If it is determined in Step S404 that the power to the peripheral device 3 to be subjected to the judgment processing is off, or if it is determined in Step S405 that the power to the user terminal 1 to which the peripheral device 3 is connected is off, the unused peripheral device detection unit 205 judges that the peripheral device 3 to be subjected to the judgment processing is not being utilized, and determines that the peripheral device 3 is the unused peripheral device (powered off). After that, the processing advances to Step S408.

In Step S407, it is determined that the peripheral device 3 to be subjected to the judgment processing is a peripheral device being used. If it is determined in Step S404 that the power to the peripheral device 3 to be subjected to the judgment processing is on, and if it is determined in Step S405 that the power to the user terminal 1 to which the peripheral device 3 is connected is on, the unused peripheral device detection unit 205 judges that the peripheral device 3 to be subjected to the judgment processing is being used, and determines that the peripheral device 3 is the peripheral device being used. After that, the processing advances to Step S408.

In Step S408, it is determined whether or not the judgment processing has been finished for all the peripheral devices 3. If the judgment processing has not been finished for all the peripheral devices 3, the peripheral device 3 to be subjected to the judgment processing is changed, and the processing advances to Step S402. If the judgment processing has been finished for all the peripheral devices 3, the processing advances to Step S409. In other words, the processing of Steps S402 to S408 is repeatedly executed until the judgment processing has been finished for all the peripheral devices 3 recorded in the peripheral device table.

In Step S409, the judgment results are output, and the administrator is notified thereof. The server device 2 outputs information for notifying of the judgment result produced by the processing of steps up to Step S408, in other words, which of the peripheral device 3 being used, the unused peripheral device that is not connected, and the unused peripheral device powered off the peripheral device 3 being managed is. As a format for outputting the information, it is preferred that an optimal output format be employed according to an embodiment as appropriate. For example, a list for notifying of the judgment result regarding all the peripheral devices 3 may be output, or an output for notifying only of the unused peripheral device may be performed. Further, as the method for the output, an optimal output method may be employed according to an embodiment as appropriate from among the output to a display, the print output, the transmission output of electronic mail or the like, the output to the storage device such as the auxiliary storage device 19 or 29, and other such output.

According to the processing illustrated in the flowchart, by instantaneously grasping the peripheral device 3 that is not currently used, the administrator may extract an idle asset or consider moving the peripheral device 3 that is connected to a given user device but is not being used to another user device.

Figure 15:
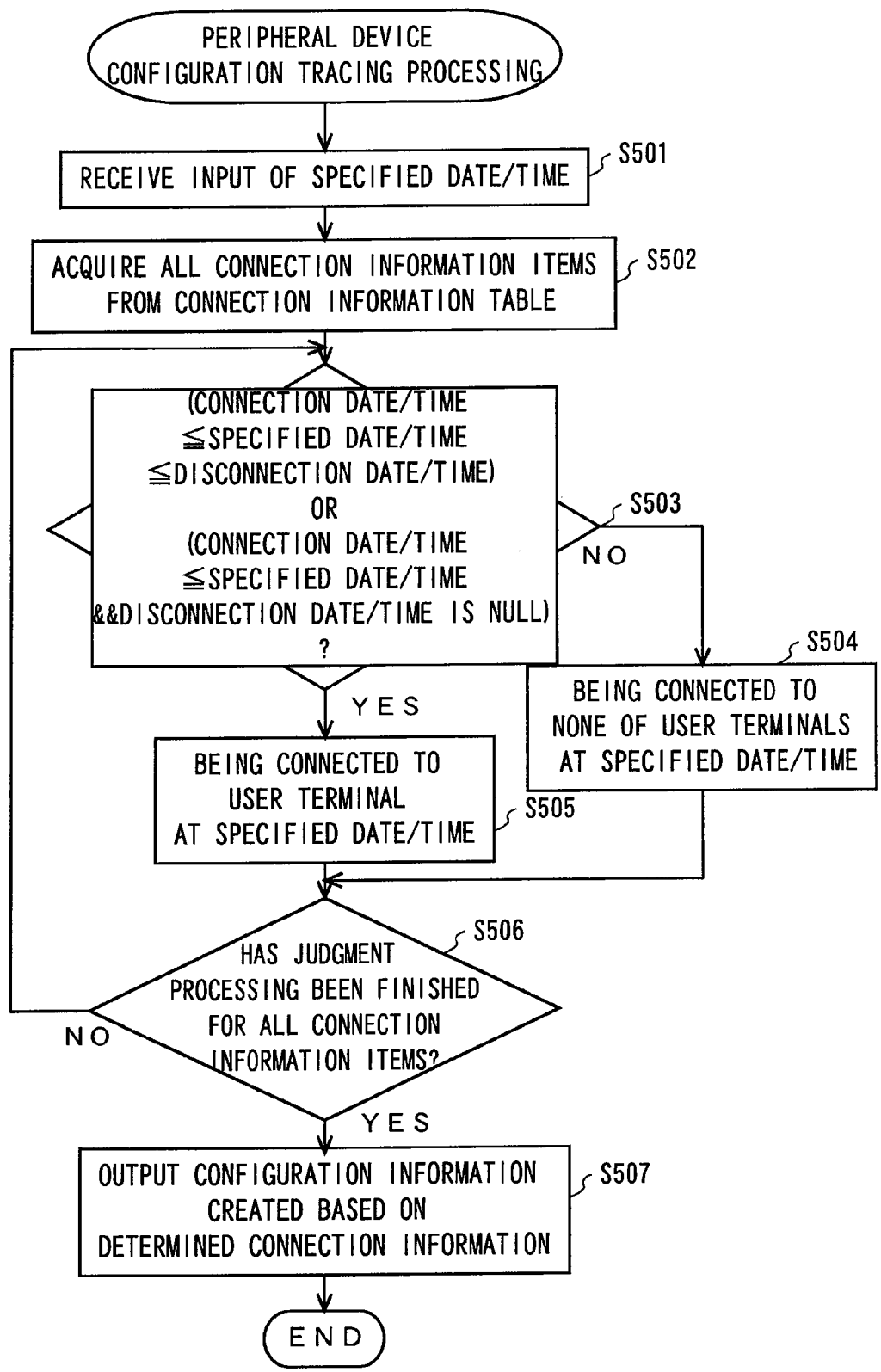
FIG. 15 is a flowchart illustrating a flow of a peripheral device configuration tracing processing according to the embodiment.

FIG. 15 is a flowchart illustrating a flow of a peripheral device configuration tracing processing according to this embodiment. The processing illustrated in the flowchart is executed with the input of a processing start instruction issued by the user or the like via the input device or the network 9 as a trigger. Note that the processing illustrated in the flowchart is a mere example in terms of specific contents and sequence of the processing, and it is preferred that the processing contents and sequence suitable to an embodiment be employed as appropriate.

In Step S501, the input of the specified date/time is received. The input reception unit 212 of the server device 2 receives the input of the specified date/time specified by the user via the input device. Here, the specified date/time represents a date/time indicating a time point at which the user wants to know the connection status of the peripheral device 3 with respect to the user terminal 1 under management of the server device 2. The input of the specified date/time may be received in a format of "year, month, day, and time", a format of "one day ago", "one week ago", or the like for indicating a time point relative to the current time, and other various formats. Irrespective of the format used for the input, the specified date/time is converted into a format that allows a comparison with the connection date/time and the disconnection date/time recorded in the connection information table. After that, the processing advances to Step S502.

In Step S502, the connection information is acquired. The server device 2 acquires all the connection information from the connection information table. After that, the processing advances to Step S503. The processing of Steps S503 to S506 described below is repeatedly executed while changing the connection information to be subjected to a judgment processing every loop until the judgment processing is finished for all the connection information.

In Steps S503 to S505, it is determined whether or not the connection information to be subjected to the judgment processing is the connection information indicating that the corresponding peripheral device 3 was connected to any one of the user terminals 1 at the specified date/time. The peripheral device extraction unit 206 extracts the values of the connection date/time and the disconnection date/time from the connection information to be subjected to the judgment processing, and determines whether or not the specified date/time input in Step S501 satisfies any one of criteria: being at or after the connection date/time and at or before the disconnection date/time; and being at or after the connection date/time with the disconnection date/time being NULL (Step S503). If it is determined that any one of the criteria is satisfied, the processing advances to Step S505. If it is determined that none of the criteria is satisfied, the processing advances to Step S504.

If the specified date/time input in Step S501 satisfies none of the criteria: being at or after the connection date/time and at or before the disconnection date/time; and being at or after the connection date/time with the disconnection date/time being NULL, the peripheral device extraction unit 206 judges that the connection information to be subjected to the judgment processing is not the connection information indicating that the corresponding peripheral device 3 was connected to any one of the user terminals 1 at the specified date/time (Step S504). After that, the processing advances to Step S506.

If the specified date/time input in Step S501 satisfies any one of the criteria: being at or after the connection date/time and at or before the disconnection date/time; and being at or after the connection date/time with the disconnection date/time being NULL, the peripheral device extraction unit 206 judges that the connection information to be subjected to the judgment processing is the connection information indicating that the corresponding peripheral device 3 was connected to any one of the user terminals 1 at the specified date/time (Step S505). After that, the processing advances to Step S506.

In Step S506, it is determined whether or not the judgment processing has been finished for all the connection information. If the judgment processing has not been finished for all the connection information, the connection information to be subjected to the judgment processing is changed, and the processing advances to Step S503. If the judgment processing has been finished for all the connection information, the processing advances to Step S507. In other words, the processing of Steps S503 to S506 is repeatedly executed until the judgment processing has been finished for all the connection information recorded in the connection information.

In Step S507, configuration information is output. In the processing of steps up to Step S506, the server device 2 creates the configuration information based on the connection information determined to be the configuration information at the specified date/time input in Step S501, and outputs the configuration information. The configuration information may be output by simply arranging the connection information items determined to be the configuration information at the specified date/time. Alternatively, a network configuration diagram indicating the connection status of the peripheral device 3 may be created based on the terminal ID, the device type, the serial number, and the like included in those connection information items, and output graphically as the configuration information. Further, as the method for the output, an optimal output method may be employed according to an embodiment as appropriate from among the output to a display, the print output, the transmission output of electronic mail or the like, the output to the storage device such as the auxiliary storage device 19 and 29, and other such output. After that, the processing illustrated in the flowchart is brought to an end.

According to the processing illustrated in the flowchart, the server device 2 references the connection information table in which the connection information is accumulated, and extracts the connection information with the connection date/time being at or before the specified date/time and the disconnection date/time being at or after the specified date/time (including the record with the disconnection date/time left blank), which allows the administrator to reference the history of the configuration information at the specified date/time.

Figure 16:
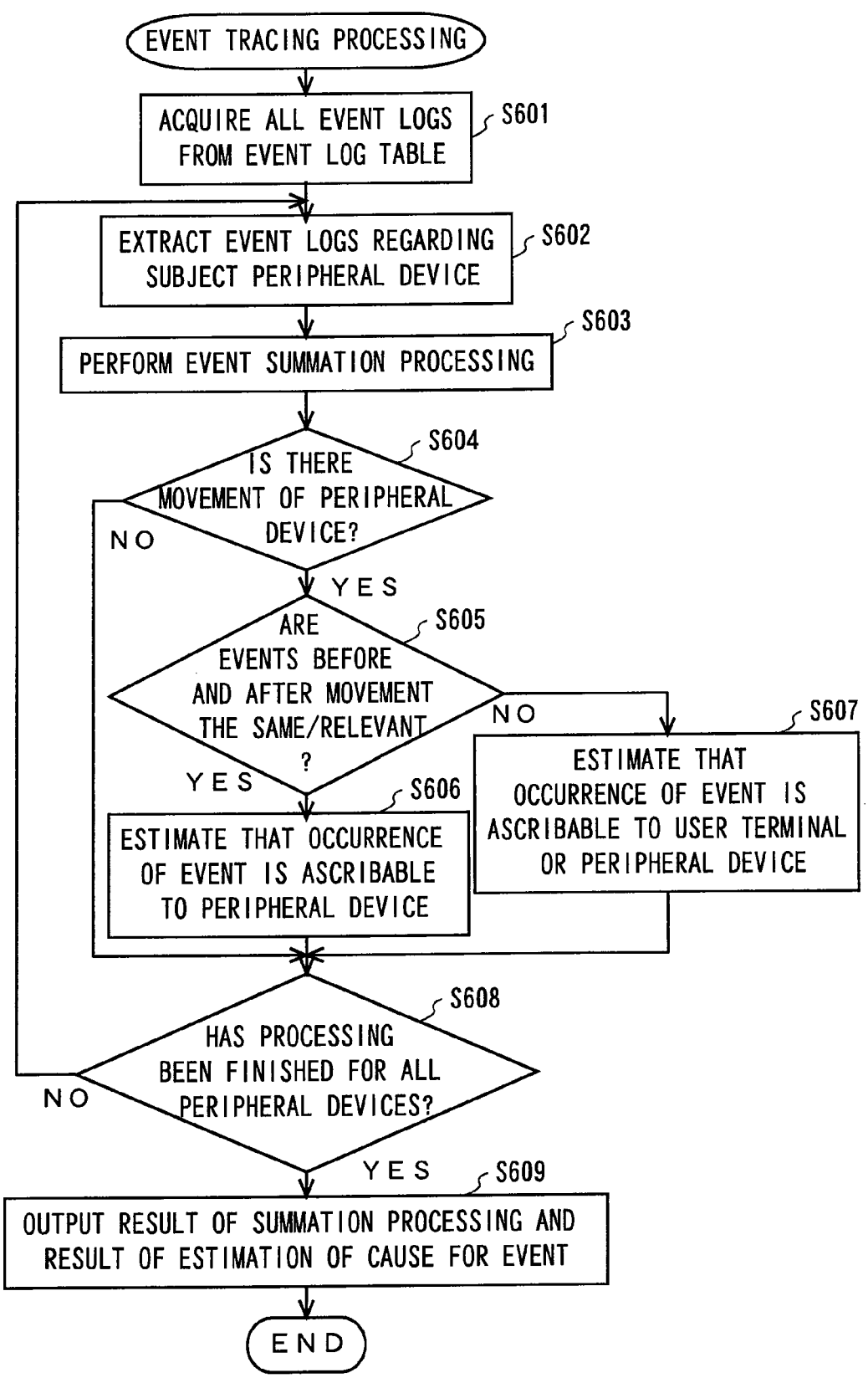
FIG. 16 is a flowchart illustrating a flow of an event tracing processing according to the embodiment.

FIG. 16 is a flowchart illustrating a flow of an event tracing processing according to this embodiment. The processing illustrated in the flowchart is executed with the input of a processing start instruction issued by the user or the like via the input device or the network 9 as a trigger. Note that the processing illustrated in the flowchart is a mere example in terms of specific contents and sequence of the processing, and it is preferred that the processing contents and sequence suitable to an embodiment be employed as appropriate.

In Step S601, the event log is acquired. The server device 2 acquires all the event logs from the event log table. After that, the processing advances to Step S602. The processing of Steps S602 to S608 described below is repeatedly executed while changing the peripheral device to be subjected to a summation processing every loop until the summation processing is finished for all the peripheral devices 3.

In Steps S602 and S603, the event logs are narrowed down for each of the peripheral devices 3, and the summation processing is performed for the narrowed event logs. The event log extraction unit 207 of the server device 2 uses the device type and the serial number to search the event logs, and extracts the event log regarding the peripheral device 3 to be subjected to the summation processing (Step S602). Then, the event log extraction unit 207 performs an event summation processing including error content analysis and summation for the extracted event logs (Step S603). For example, for the peripheral device 3 to be subjected to the summation processing, the event log extraction unit 207 may perform calculation of error times within a predetermined period, classification of error contents (messages), or the like. For example, in the event log illustrated in FIG. 6, if the summation processing is performed for the scanner 3a having the serial number of A, the fact that an error of the message "Error1" occurred three times from Jan. 1, 2010 until Jan. 4, 2010 and other such fact are output as the summation results. After that, the processing advances to Step S604.

In Step S604, the presence/absence of the movement of the peripheral device 3 is determined. The server device 2 references the event log regarding the peripheral device 3 to be subjected to the summation processing, which is extracted in Step S602, to determine whether or not the event log having the terminal ID indicating the user terminal different from the currently-connected user terminal is included, to thereby determine whether or not the peripheral device 3 was connected to the user terminal different from the currently-connected user terminal in the past. Note that only the connection status in the near past may be set as the determination subject by limiting the event log of the determination subject to the event log regarding the occurrence date/time within a predetermined period from the present date/time to the past (for example, within the past one week) or by performing other such operation. If it is determined that the peripheral device 3 was connected to the user terminal different from the currently-connected user terminal in the past, the processing advances to Step S605. Otherwise, the processing advances to Step S608.

In Step S605, a comparison is performed between the events that occurred before and after the movement of the peripheral device 3. The estimation unit 208 checks whether or not, when the peripheral device 3 to be subjected to the summation processing was connected to the user terminal different from the currently-connected user terminal in the past, there occurred an error which is the same as or related to the error that has currently occurred in the peripheral device 3. More specifically, if the event log having the terminal ID indicating the user terminal different from the currently-connected user terminal is included in the event log regarding the peripheral device 3 to be subjected to the summation processing, the estimation unit 208 determines whether or not the message recorded in the event log is a message which is the same as or related to the message of the currently-occurring error (message recorded in the recent event log).

Note that here, the event log referenced for identifying the message of the currently-occurring error may be the latest event log regarding the peripheral device 3 to be subjected to the summation processing, or may be the last event log within a predetermined past period (for example, within the past one day) regarding the peripheral device 3 to be subjected to the summation processing. Note that in the step, the predetermined period set for identifying the message of the currently-occurring error is a period different from the predetermined period for determining the connection status with respect to the different user terminal 1 described in Step S604, and a shorter period is set.

As a result of the determination, if it is determined that there occurred an error which is the same as or related to the error that has currently occurred in the peripheral device 3 to be subjected to the summation processing when the peripheral device 3 was connected to the user terminal 1 different from the currently-connected user terminal 1 in the past, the processing advances to Step S606. On the other hand, if it is determined that a different error occurred, the processing advances to Step S607.

In Steps S606 and S607, estimation of the cause for the currently-occurring error is performed. If there occurred the error which is the same as or related to the currently-occurring error also when the peripheral device 3 to be subjected to the summation processing was connected to another user terminal 1 in the past, the estimation unit 208 determines that the error is an error ascribable to the peripheral device 3 (Step S606). On the other hand, if the error which is the same as or related to the currently-occurring error did not occur when the peripheral device 3 to be subjected to the summation processing was connected to another user terminal 1 in the past, the estimation unit 208 determines that the currently-occurring error is an error ascribable to the user terminal 1 or the peripheral device 3 (Step S607). After that, the processing advances to Step S608.

In Step S608, it is determined whether or not the summation processing is finished for all the peripheral devices 3. If the summation processing is not finished for all the peripheral devices 3, the peripheral device 3 to be subjected to the summation processing is changed, and the processing advances to Step S602. If the summation processing is finished for all the peripheral devices 3, the processing advances to Step S609. In other words, the processing of Steps S602 to S608 is repeatedly executed until the summation processing is finished for all the peripheral devices 3 recorded in the peripheral device table.

In Step S609, the output of the summation result is performed. The server device 2 outputs the result of the summation processing for the event logs, which is performed in Step S603, and the result of the estimation of the cause for the currently-occurring error, which is performed in Step S606 or S607. In the same manner as the outputs performed in the other flowcharts described above, as the method for the output, an optimal output method may be employed according to an embodiment as appropriate from among the output to a display, the print output, the transmission output of electronic mail or the like, the output to the storage device such as the auxiliary storage device 19 or 29, and other such output. After that, the processing illustrated in the flowchart is brought to an end.

Note that with reference to the flowchart, the description is made of the method of performing the summation on a peripheral device basis by using the device type and the serial number to narrow down the event logs, but instead, the summation may be performed on a user terminal 1 basis by using the terminal ID to narrow down the event logs. According to the processing illustrated in the flowchart, the administrator may grasp the history of the event logs based on the user terminal 1 and the peripheral device 3, and may further grasp the estimation result of the cause for the occurrence of the error with ease.

Figure 17:
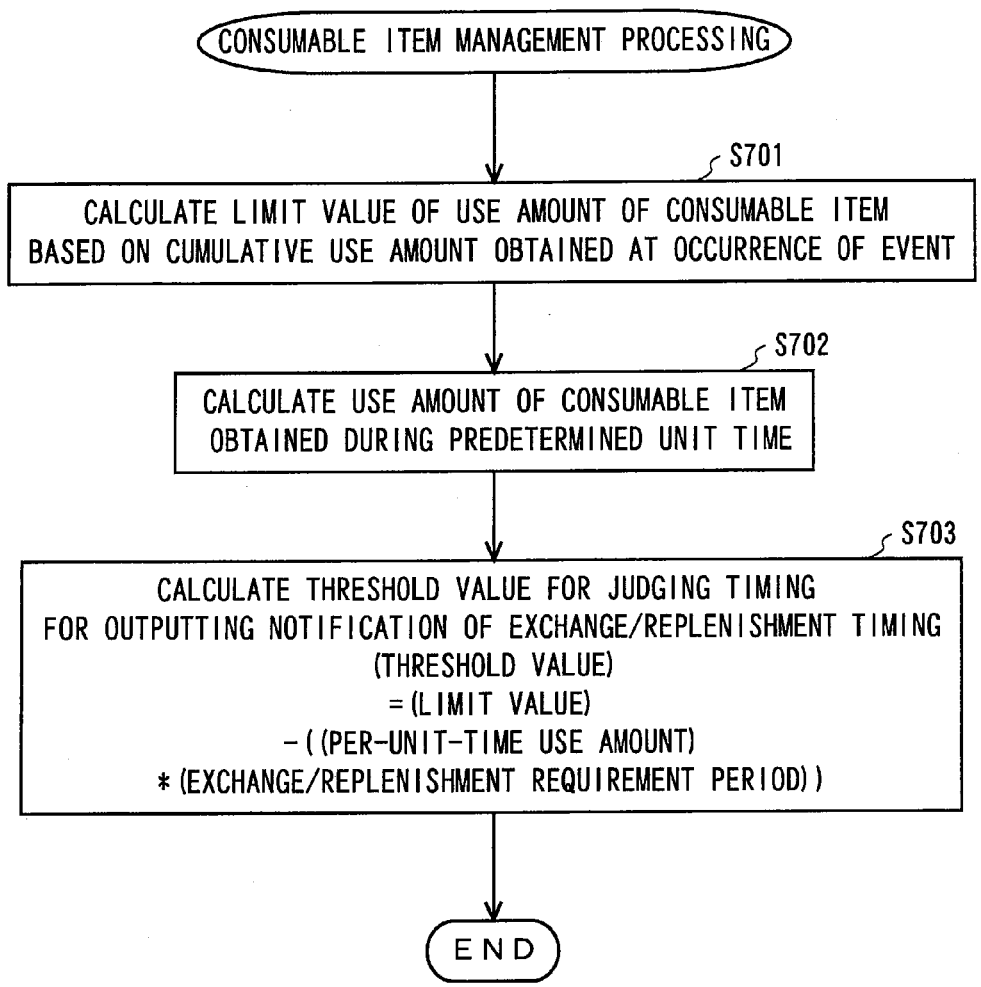
FIG. 17 is a flowchart illustrating a flow of a consumable item management processing according to the embodiment.

FIG. 17 is a flowchart illustrating a flow of a consumable item management processing according to this embodiment. The processing illustrated in the flowchart is executed on a regular basis or with the input of a processing start instruction issued by the user or the like via the input device or the network 9 as a trigger. Note that the processing illustrated in the flowchart is a mere example in terms of specific contents and sequence of the processing, and it is preferred that the processing contents and sequence suitable to an embodiment be employed as appropriate.

Information (consumable item information on the peripheral device) related to the consumable items (for example, toner, paper, and battery), which is used in the processing illustrated in the flowchart, is collected or acquired by the user terminal 1 in Step S101 of the information collection processing described above, Step S202 of the disconnection detection processing described above, or the like, and is accumulated in the peripheral device table, the use history table, the event log table, the connection information table, the consumable item characteristic table, the use tendency table, and the like on the user terminal 1 side.

In Step S701, a consumable item characteristic is analyzed on a consumable item basis, and the limit value of the use amount of the consumable item is set. The limit value calculation unit 104 of the user terminal 1 analyzes the consumable item characteristic based on the cumulative use amount of the consumable item, which is acquired from the peripheral device table, and the event log related to the consumable item, calculates the limit value of the use amount of the consumable item, and updates the limit value set in the consumable item characteristic table. Here, the limit value of the use amount represents a value indicating how much amount of the consumable item may be used at the maximum before the replacement becomes necessary (replenishment becomes necessary), and may be calculated by various methods. For example, the possible methods include a method of setting the cumulative use amount obtained at the occurrence of the event as the limit value without change, a method of setting an average of the cumulative use amount obtained at the occurrence of the event and the previous limit value as the limit value, and a method of setting an average of the cumulative use amount obtained at the occurrence of the event and the past limit value results as the limit value.

Specifically, in a case where the method of setting the cumulative use amount obtained at the occurrence of the event as the limit value without change is employed, if the cumulative use amount obtained at the occurrence of the event is 10,000 times, "10,000" is set as the limit value. In a case where the method of setting the average of the cumulative use amount obtained at the occurrence of the event and the previous limit value as the limit value is employed, if the previous limit value is 20,000 times and if the cumulative use amount obtained at the occurrence of the event is 10,000 times, the average thereof, that is, "15,000" (=(20,000+10,000)/2) is set as the limit value. Further, in a case where the method of setting the average of the cumulative use amount obtained at the occurrence of the event and the past limit value results as the limit value is employed, if the limit values set so far are 18,000, 17,000, and 19,000 and if the cumulative use amount obtained at the occurrence of the event is 10,000 times, the average thereof, that is, "16,000" (=(18,000+17,000+19,000+10,000)/4) is set as the limit value. After that, the processing advances to Step S702.

Note that in the consumable item characteristic table illustrated in FIG. 8, the value that reads "default" is a use amount upper limit value provided by a vendor of the peripheral device. The use amount upper limit value provided by the vendor may be set as the initial value of the limit value. Further, in the calculation of the limit value performed at a time point when the previous limit value or the past limit values are not accumulated, the use amount upper limit value provided by the vendor may be used as the previous limit value or the past limit values.

In Step S702, the use tendency is analyzed to set the use amount of the consumable item obtained during a predetermined unit time (in this embodiment, one day). The use tendency calculation unit 105 of the user terminal 1 analyzes the use tendency of the consumable item for the peripheral device for each of the peripheral devices 3 based on the use period and the use amount obtained during the use period which are grasped from the use history table, and calculates the use amount of the consumable item obtained during the predetermined unit time. Specifically, the use amount of the consumable item obtained during the unit time may be calculated by dividing the use amount obtained during a use period by the use period. Here, the use period may be acquired by calculating a time from the connection date/time read from the use history table to the disconnection date/time read therefrom. Note that if the disconnection date/time is NULL, the use period may be calculated by calculating a time from the connection date/time to the present date/time. The calculated per-unit-time use amount is set into the use tendency table.

For example, with regard to the use of the consumable item "a" for the scanner 3a having the serial number "A", if the use amount obtained during the use period of two days from Jan. 1, 2010 until Jan. 3, 2010 is 400 times and if the use amount obtained during the use period of four days from Jan. 6, 2010 until a use tendency analysis time point (here, set as Jan. 10, 2010) is 800 times, the use amount of the consumable item obtained during the unit time of one day is 200 times/day (=(400+800) times/(2+4) days). The use amount obtained during a predetermined unit period is calculated and set, and after that, the processing advances to Step S703.

In Step S703, the threshold value for notification outputting is calculated and set from the consumable item characteristic and the use tendency. Based on the limit value of the use amount of the consumable item, which is set in Step S701, and the use amount of the consumable item obtained during the predetermined unit time, which is set in Step S702, the threshold value calculation unit 106 of the user terminal 1 calculates a threshold value for judging a timing for outputting a notification that informs the administrator of the exchange/replenishment timing for the consumable item, and sets the threshold value into the peripheral device table.

Here, the threshold value is the value for judging the timing for outputting the notification that informs the administrator of the exchange/replenishment timing for the consumable item in consideration of how much time is required for the exchange/replenishment of the consumable item, and may be calculated by various methods. Possible examples thereof include a method of setting a value obtained by subtracting (per-unit-time use amount)*(exchange/replenishment requirement period) from the limit value as the threshold value. Specifically, if the exchange/replenishment requirement period is set to 10 days with the limit value set to 10,000 times and the per-unit-time use amount set to 130 times/day, "8,700" (=10,000−130*10) is set as the threshold value.

Note that methods that may be employed as the setting of the exchange/replenishment requirement period used for the calculation of the threshold value include: a method in which the setting is performed by the administrator; and a method in which a period required in the past from the outputting of the notification until resetting of the cumulative use amount (the cumulative use amount is reset to 0 due to the exchange, the replenishment, or the like of the consumable item) is stored in advance, and based on the stored period, the exchange/replenishment requirement period is variably set on a consumable item basis. For example, if the past outputting of the notification regarding a given consumable item took place on Jan. 10, 2009 and if the resetting of the cumulative use amount due to the exchange/replenishment or the like of the consumable item according to the notification took place on Jan. 20, 2009, it turns out that 10 days were required for the exchange/replenishment, and hence "10 days" is set as the exchange/replenishment requirement period with regard to the consumable item.

After the calculation and the setting of the threshold value are completed, the processing illustrated in the flowchart is brought to an end. The comparison unit 107 of the user terminal 1 monitors the cumulative use amount of the consumable item for the connected peripheral device 3, and compares the threshold value set in Step S703 with the cumulative use amount on a regular basis or each time the cumulative use amount is updated. Then, if the cumulative use amount exceeds the threshold value, the notification outputting unit 108 of the user terminal 1 outputs the notification that informs the administrator of the exchange/replenishment timing for the consumable item. Specifically, if the consumable item is the toner for the printer 3b, a notification message such as "Running out of toner in about 10 days. Replenish the toner by then." is output to the administrator by an output method employed according to an embodiment from among the output to a display, the print output, the transmission output of electronic mail or the like, the output to the storage device such as the auxiliary storage device 19 or 29, and other such output.

According to the processing illustrated in the flowchart, it is possible to notify the administrator or the user of an alert related to the consumable item used on the peripheral device 3 at an appropriate timing. Note that in this embodiment, the description is made by taking the user terminal 1 as a main component that executes the consumable item management processing, but the consumable item management processing is not necessarily performed by the user terminal 1 to which the peripheral device 3 is connected. For example, the consumable item management processing may be executed by the server device 2 after information (table and the like) necessary for the processing is transmitted from the user terminal 1 to the server device 2.

All example and conditional language recited herein are intended for pedagogical purposes to aid the reader in understanding the invention and the concepts contributed by the inventor to furthering the art, and are to be construed as being without limitation to such specifically recited examples and conditions, nor does the organization of such example in the specification relate to a showing of the superiority and inferiority of the invention. Although the embodiment(s) of the present invention(s) has (have) been described in detail, it should be understood that the various changes, substitutions, and alterations could be made hereto without departing from the spirit and scope of the invention.

What is claimed is:

1. A server device, comprising:
   a processor configured to receive terminal information including information that identifies each of information processing devices communicably connected to the server device via a network, the terminal information being transmitted from the information processing devices, wherein the information that identifies each of the information processing devices includes MAC address of the information processing device, and peripheral device information including information that identifies each of peripheral devices connected to the information processing devices via an interface for peripheral device connection conforming to a communication standard for peripheral devices, which is different from a communication interface connected to the network, wherein information that identifies each of the peripheral devices includes serial number of the peripheral device; and
   said processor configured to accumulate the terminal information and the peripheral device information in association with the information that identifies each of the information processing devices that is an information transmission source and the information that identifies each of the peripheral devices, wherein:
   said processor further receives date and time information regarding connection or disconnection of the peripheral devices detected by a driver of each of the information processing devices, the date and time information being transmitted from the information processing devices;
   said processor accumulates the date and time information in association with the information that identifies each of the information processing devices regarding the connection or the disconnection and the information that identifies each of the peripheral devices;
   said processor configured to detect that the peripheral device has been moved by being disconnected from one of the information processing devices and being connected to another one of the information processing devices, by way of searching the date and time information accumulated by said processor based on the information that identifies each of the peripheral devices, to thereby extract a history of the connection and the disconnection of the peripheral devices to and from the information processing devices;
   said processor configured to receive an input of a specified date and time, wherein the specified data date and time is converted into a format that allows a comparison with the date and time regarding connection and disconnection that is accumulated;
   said processor configured to extract the peripheral device that was connected to any one of the information processing devices at the specified date and time by extracting, from the date and time information accumulated by said processor, date and time information with a date and time regarding the connection being at or before the specified date and time and a date and time regarding the disconnection being at or after the specified date and time or being unrecorded;
   said processor further receives an event log of an event that has occurred on the information processing devices, the event log being transmitted from the information processing devices;
   said processor further accumulates the event log in association with the information that identifies each of the information processing devices regarding the event and the information that identifies each of the peripheral devices regarding the event; and
   the server device further comprises: said processor configured to search the event log accumulated by said processor based on information that identifies a predetermined peripheral device, to thereby extract the event log regarding the predetermined peripheral device; and said processor configured to estimate a cause for an occurrence of the event of an error by judging, if said processor has detected that the predetermined peripheral device has been moved by being disconnected from one of the information processing devices and being connected to another one of the information processing devices, whether or not contents of the event log regarding the predetermined peripheral device which is extracted by said processor are changed before and after the movement.

2. The server device according to claim 1, wherein:
   said processor further receives an activation state of the peripheral devices connected to the information processing devices, the activation state being transmitted from the information processing devices; and
   the server device further comprises:
       said processor configured to update the peripheral device information accumulated by said processor based on the date and time information received by said processor so as to enable judgment as to whether or not the peripheral device regarding the peripheral device information is connected to any one of the information processing devices; and
       said processor configured to detect the peripheral device that has not been activated and the peripheral device that is not connected to any one of the information processing devices by referencing the activation state and the peripheral device information.

3. The server device according to claim 1, wherein:
said processor further receives software information transmitted from the information processing device, the software information including information on software installed on the peripheral device connected to the information processing device, and information on software related to the peripheral device, which is installed on the information processing device, and the server device further comprises:
said processor configured to retain correlation information for judging a correlation between the software installed on the information processing device and the software installed on the peripheral device;
said processor configured to judge, by referencing the correlation information based on the software information received by said processor, whether or not the software installed on the information processing device and the software installed on the peripheral device have a predetermined correlation; and
said processor configured to transmit, if it is judged that the software installed on the information processing device and the software installed on the peripheral device do not have the predetermined correlation, a software change request necessary to satisfy the predetermined correlation to the information processing device.

4. A peripheral device management method, comprising:
receiving, by a computer serving as a server device, terminal information including information that identifies each of user terminals communicably connected to the computer via a network, the terminal information being transmitted from the user terminals, wherein the information that identifies each of the user terminal includes MAC address of the user terminal, and peripheral device information including information that identifies each of peripheral devices connected to the user terminals via an interface for peripheral device connection conforming to a communication standard for peripheral devices, which is different from a communication interface connected to the network, wherein information that identifies each of the peripheral devices includes serial number of the peripheral device; and
accumulating, by the computer, the terminal information and the peripheral device information in association with the information that identifies each of the user terminals that is an information transmission source and the information that identifies each of the peripheral devices, wherein:
said receiving, by the computer, further receives date and time information regarding connection or disconnection of the peripheral devices detected by a driver of each of the user terminals, the date and time information being transmitted from the user terminals;
said accumulating, by the computer, accumulates the date and time information in association with the information that identifies each of the user terminals regarding the connection or the disconnection and the information that identifies each of the peripheral devices;
detecting, by the computer, that the peripheral device has been moved by being disconnected from one of the user terminals and being connected to another one of the user terminals, by way of searching the date and time information accumulated by the computer based on the information that identifies each of the peripheral devices, to thereby extract a history of the connection and the disconnection of the peripheral devices to and from the user terminals;
receiving, by the computer, an input of a specified date and time, wherein the specified date and time is converted into a format that allows a comparison with the date and time regarding connection and disconnection that is accumulated;
extracting, by the computer, the peripheral device that was connected to any one of the user terminals at the specified date and time by extracting, from the date and time information accumulated by the computer, date and time information with a date and time regarding the connection being at or before the specified date and time and a date and time regarding the disconnection being at or after the specified date and time or being unrecorded;
said receiving, by the computer, further receives an event log of an event that has occurred on the user terminals, the event log being transmitted from the user terminals;
said accumulating, by the computer, further accumulates the event log in association with the information that identifies each of the user terminals regarding the event and the information that identifies each of the peripheral devices regarding the event; and
the peripheral device management method further comprises: searching, by the computer, the event log accumulated by the computer based on information that identifies a predetermined peripheral device, to thereby extract the event log regarding the predetermined peripheral device; and estimating, by the computer, a cause for an occurrence of the event of an error by judging, if the computer has detected that the predetermined peripheral device has been moved by being disconnected from one of the user terminals and being connected to another one of the user terminals, whether or not contents of the event log regarding the predetermined peripheral device which is extracted by the computer are changed before and after the movement.

5. The peripheral device management method according to claim 4, wherein:
said receiving, by the computer, further receives an activation state of the peripheral devices connected to the user terminals, the activation state being transmitted from the user terminals; and
the peripheral device management method further comprises:
updating, by the computer, the peripheral device information accumulated by the computer based on the date and time information received by the computer so as to enable judgment as to whether or not the peripheral device regarding the peripheral device information is connected to any one of the user terminals; and
detecting, by the computer, the peripheral device that has not been activated and the peripheral device that is not connected to any one of the user terminals by referencing the activation state and the peripheral device information.

6. The peripheral device management method according to claim 4, wherein:
said receiving, by the computer, further receives software information transmitted from the user terminal, the software information including information on software installed on the peripheral device connected to the user terminal, and information on software related to the peripheral device, which is installed on the user terminal, and the peripheral device management method further comprises:

retaining, by the computer, correlation information for judging a correlation between the software installed on the user terminal and the software installed on the peripheral device;

judging, by the computer, by referencing the correlation information based on the software information received by the computer, whether or not the software installed on the user terminal and the software installed on the peripheral device have a predetermined correlation; and transmitting, by the computer, if it is judged that the software installed on the user terminal and the software installed on the peripheral device do not have the predetermined correlation, a software change request necessary to satisfy the predetermined correlation to the user terminal.

* * * * *